United States Patent
Xue et al.

(10) Patent No.: US 11,576,205 B2
(45) Date of Patent: Feb. 7, 2023

(54) ENHANCED MEASUREMENTS FOR NEW RADIO-UNLICENSED

(71) Applicant: QUALCOMM Incorporated, San Diego, CA (US)

(72) Inventors: Yisheng Xue, San Diego, CA (US); Xiaoxia Zhang, San Diego, CA (US); Jing Sun, San Diego, CA (US); Arumugam Chendamarai Kannan, San Diego, CA (US); Vinay Chande, San Diego, CA (US); Giovanni Chisci, San Diego, CA (US); Hua Wang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 17/108,453

(22) Filed: Dec. 1, 2020

(65) Prior Publication Data

US 2021/0176783 A1     Jun. 10, 2021

Related U.S. Application Data

(60) Provisional application No. 62/946,245, filed on Dec. 10, 2019.

(51) Int. Cl.
*H04W 16/14* (2009.01)
*H04W 74/08* (2009.01)
*H04W 24/10* (2009.01)

(52) U.S. Cl.
CPC ....... *H04W 74/0808* (2013.01); *H04W 16/14* (2013.01); *H04W 24/10* (2013.01)

(58) Field of Classification Search
None
See application file for complete search history.

(56) References Cited

U.S. PATENT DOCUMENTS

2013/0322279 A1* 12/2013 Chincholi ............. H04L 43/106
                                                    370/252
2017/0171887 A1*  6/2017 Shi .................... H04W 74/0816
(Continued)

FOREIGN PATENT DOCUMENTS

EP        3169112 A1    5/2017
WO    WO-2019192444 A1   10/2019

OTHER PUBLICATIONS

International Search Report and Written Opinion—PCT/US2020/062850—ISA/EPO—dated Mar. 18, 2021.

*Primary Examiner* — Dai Phuong
(74) *Attorney, Agent, or Firm* — Norton Rose Fulbright LLP/Qualcomm Incorporated

(57) ABSTRACT

Enhanced measurements for new radio-unlicensed (NR-U) operations are disclosed. Compatible user equipments (UEs) may be configured to perform virtual full listen before talk (LBT) procedures for measurement purposes. The UEs may then compile LBT statistics derived from the virtual LBT procedures and include such statistics in an enhanced measurement report the their serving base stations. The LBT statistics provide a more direct and detailed reflection of the usage of a shared communication channel. Such UEs may further be configured to gather additional LBT statistics from transmission-based LBT procedures in addition to the virtual LBT procedures. The additional direct and detailed usage of a shared channel may then be provided in the enhanced measurement reports in accordance with described aspects.

30 Claims, 11 Drawing Sheets

(56) References Cited

U.S. PATENT DOCUMENTS

| | | | |
|---|---|---|---|
| 2017/0257888 A1* | 9/2017 | Kn | H04W 74/0816 |
| 2018/0035393 A1* | 2/2018 | Kazmi | H04W 52/346 |
| 2018/0167970 A1* | 6/2018 | Yoshimura | H04W 74/006 |
| 2022/0014337 A1* | 1/2022 | Ouchi | H04L 5/0057 |

* cited by examiner

ENHANCED MEASUREMENTS FOR NEW RADIO-UNLICENSED

CROSS-REFERENCE TO RELATED APPLICATIONS

This application claims the benefit of U.S. Provisional Patent Application No. 62/946,245, entitled, "ENHANCED MEASUREMENTS FOR NEW RADIO—UNLICENSED," filed on Dec. 10, 2019, which is expressly incorporated by reference herein in its entirety.

BACKGROUND

Field

Aspects of the present disclosure relate generally to wireless communication systems, and more particularly, to enhanced measurements for new radio-unlicensed (NR-U) operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes obtaining, by a UE, configuration to perform one or more virtual full listen before talk (LBT) procedures over an LBT bandwidth, generating, by the UE, an LBT measurement report, wherein the LBT measurement report includes a plurality of LBT statistics including a result of the one or more virtual full LBT procedures, and transmitting, by the UE, the LBT measurement report to a serving base station.

In an additional aspect of the disclosure, a method of wireless communication includes configuring, by a base station, one or more virtual LBT procedures for at least one served UE within an LBT bandwidth, signaling, by the base station, a configuration of the one or more virtual full LBT procedures to the at least one served UEs, receiving, by the base station, an LBT measurement report from the at least one served UEs, wherein the LBT measurement report includes a plurality of LBT statistics including a result of the one or more virtual full LBT procedures, and determining, by the base station, radio resource management of a connection with the at least one served UEs using the plurality of LBT statistics.

In an additional aspect of the disclosure, an apparatus configured for wireless communication includes means for obtaining, by a UE, configuration to perform one or more virtual full LBT procedures over an LBT bandwidth, means for generating, by the UE, an LBT measurement report, wherein the LBT measurement report includes a plurality of LBT statistics including a result of the one or more virtual full LBT procedures, and means for transmitting, by the UE, the LBT measurement report to a serving base station.

In an additional aspect of the disclosure, an apparatus configured for wireless communication includes means for configuring, by a base station, one or more virtual LBT procedures for at least one served UE within an LBT bandwidth, means for signaling, by the base station, a configuration of the one or more virtual full LBT procedures to the at least one served UEs, means for receiving, by the base station, an LBT measurement report from the at least one served UEs, wherein the LBT measurement report includes a plurality of LBT statistics including a result of the one or more virtual full LBT procedures, and means for determining, by the base station, radio resource management of a connection with the at least one served UEs using the plurality of LBT statistics.

In an additional aspect of the disclosure, a non-transitory computer-readable medium having program code recorded thereon. The program code further includes code to obtain, by a UE, configuration to perform one or more virtual full LBT procedures over an LBT bandwidth, code to generate, by the UE, an LBT measurement report, wherein the LBT measurement report includes a plurality of LBT statistics including a result of the one or more virtual full LBT procedures, and code to transmit, by the UE, the LBT measurement report to a serving base station.

In an additional aspect of the disclosure, a non-transitory computer-readable medium having program code recorded thereon. The program code further includes code to configure, by a base station, one or more virtual LBT procedures for at least one served UE within an LBT bandwidth, code to signal, by the base station, a configuration of the one or more virtual full LBT procedures to the at least one served UEs, code to receive, by the base station, an LBT measurement report from the at least one served UEs, wherein the LBT measurement report includes a plurality of LBT statistics including a result of the one or more virtual full LBT procedures, and code to determine, by the base station, radio resource management of a connection with the at least one served UEs using the plurality of LBT statistics.

In an additional aspect of the disclosure, an apparatus configured for wireless communication is disclosed. The apparatus includes at least one processor, and a memory coupled to the processor. The processor is configured to obtain, by a UE, configuration to perform one or more virtual full LBT procedures over an LBT bandwidth, to generate, by the UE, an LBT measurement report, wherein the LBT measurement report includes a plurality of LBT statistics including a result of the one or more virtual full LBT procedures, and to transmit, by the UE, the LBT measurement report to a serving base station.

In an additional aspect of the disclosure, an apparatus configured for wireless communication is disclosed. The apparatus includes at least one processor, and a memory coupled to the processor. The processor is configured to configure, by a base station, one or more virtual LBT procedures for at least one served UE within an LBT bandwidth, to signal, by the base station, a configuration of the one or more virtual full LBT procedures to the at least one served UEs, to receive, by the base station, an LBT measurement report from the at least one served UEs, wherein the LBT measurement report includes a plurality of LBT statistics including a result of the one or more virtual full LBT procedures, and to determine, by the base station, radio resource management of a connection with the at least one served UEs using the plurality of LBT statistics.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
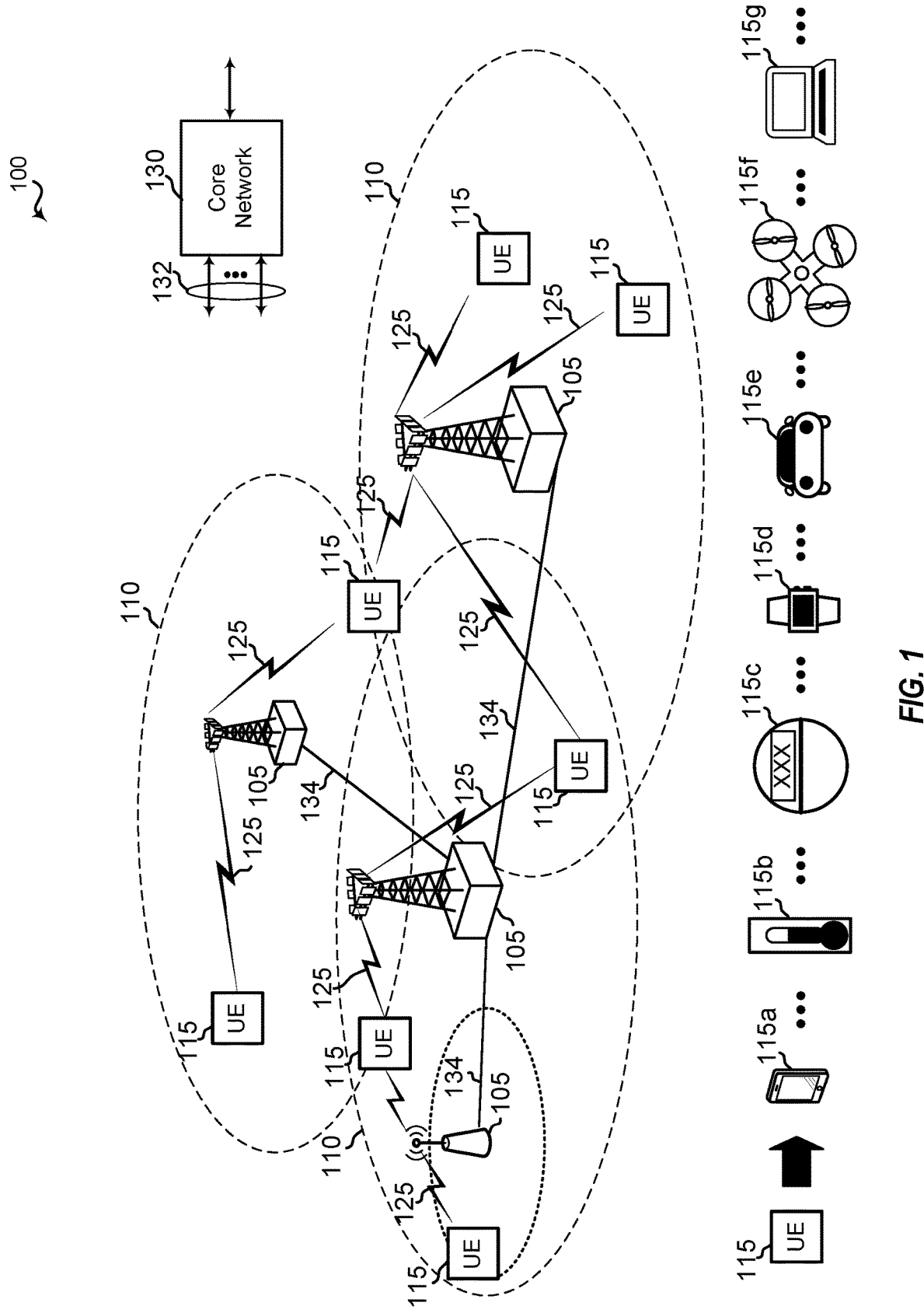
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating an example of a wireless communications system 100 that supports configuration of UEs 115 to perform virtual full listen before talk (LBT) procedures for measurement purposes. UEs 115 may then compile LBT statistics derived from the virtual LBT procedures and include such statistics in an enhanced measurement report the their serving base stations, base stations 105. The LBT statistics provide a more direct and detailed reflection of the usage of a shared communication channel. UEs 115 may further be configured to gather such LBT statistics from transmission-based LBT procedures in addition to the virtual LBT procedures. The additional direct and detailed usage of a shared channel may then be provided in the enhanced measurement reports in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be referred to as forward link transmissions while uplink transmissions may also be referred to as reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and, therefore, provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone (UE 115a), a personal digital assistant (PDA), a wearable device (UE 115d), a tablet computer, a laptop computer (UE 115g), or a personal computer. In some examples, a UE 115 may also refer to a wireless local loop (WLL) station, an Internet-of-things (IoT) device, an Internet-of-everything (IoE) device, an MTC device, or the like, which may be implemented in various articles such as appliances, vehicles (UE 115e and UE 115f), meters (UE 115b and UE 115c), or the like.

Some UEs 115, such as MTC or IoT devices, may be low cost or low complexity devices, and may provide for automated communication between machines (e.g., via machine-to-machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In other cases, UEs 115 may be designed to support critical functions (e.g., mission critical functions), and a wireless communications system 100 may be configured to provide ultra-reliable communications for these functions.

In certain cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling of resources for D2D communications. In other cases, D2D communications may be carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Wireless communications system 100 may include operations by different network operating entities (e.g., network operators), in which each network operator may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In various implementations, wireless communications system 100 may use both licensed and unlicensed radio frequency spectrum bands. For example, wireless communications system 100 may employ license assisted access (LAA), LTE-unlicensed (LTE-U) radio access technology, or NR technology in an unlicensed band (NR-U), such as the 5 GHz ISM band. In some cases, UE 115 and base station 105 of the wireless communications system 100 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available.

A CCA may include an energy detection procedure to determine whether there are any other active transmissions on the shared channel. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include message detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, a 25-µs or 16-µs LBT provides for the node to perform a short CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again. A CAT 3 LBT may also be referred to as a full LBT procedure or full length LBT procedure.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In certain implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In additional cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot, while in other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier," as may be used herein, refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In certain instances, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum, such as NR-shared spectrum (NR-SS)). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In additional cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
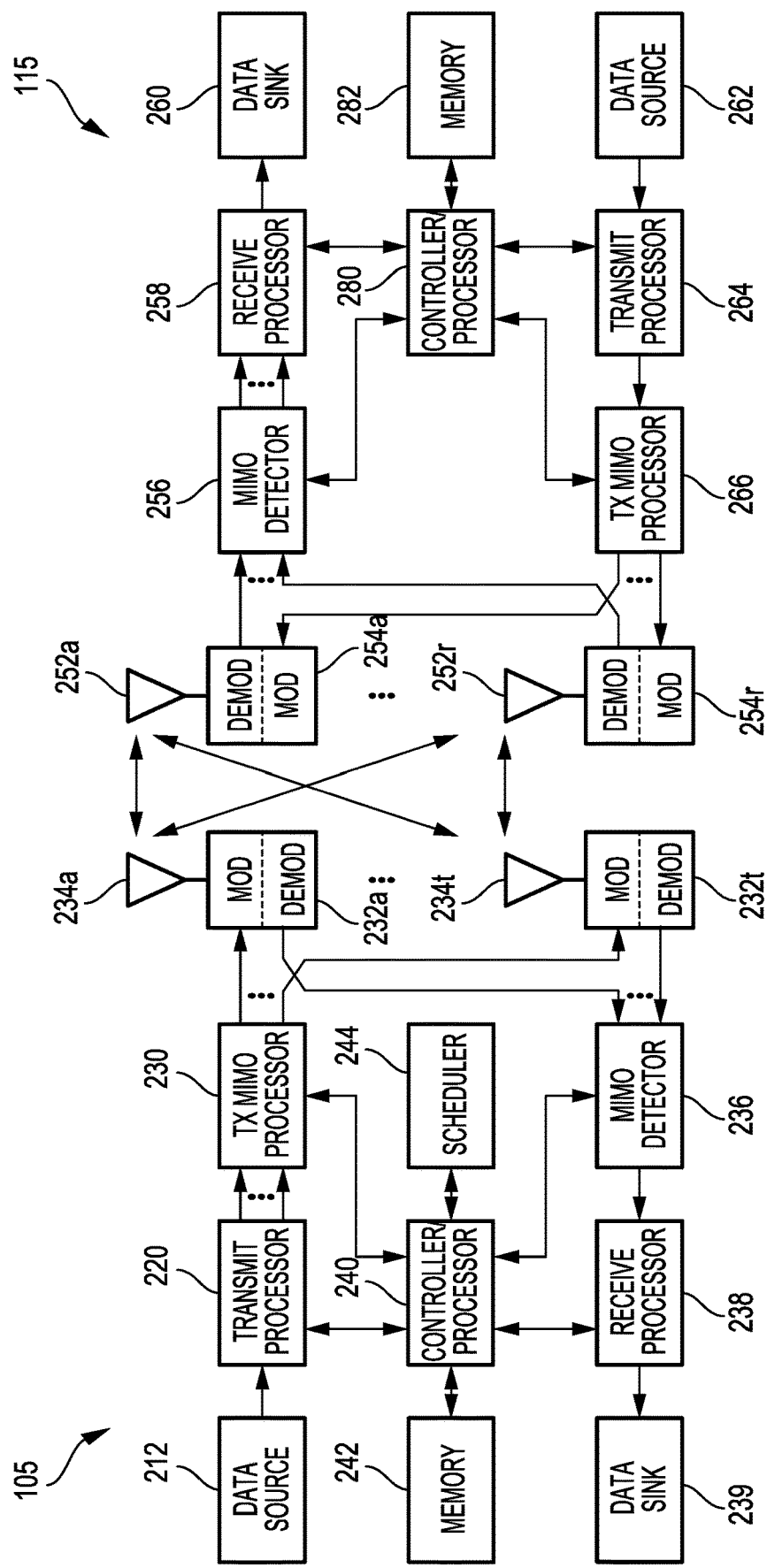
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 4, and/or other processes for the techniques described herein. The memories 242 and 282 may store data and program codes for the base station 105 and the UE 115, respectively. A scheduler 244 may schedule UEs for data transmission on the downlink and/or uplink.

Relevant entities (e.g., Federal Communications Commission (FCC), European Telecommunications Standards Institute (ETSI), etc.) are currently considering definition of channel access rules for 6 GHz unlicensed spectrum. Other standards entities (e.g., 3GPP, etc.) are indicating application of NR-U operations also for sub-7 GHz unlicensed spectrum. The criteria that have been defined in the current 3GPP Release 16 (Rel' 16) standard focuses on the 5 GHz band frequency spectrum and deployment of enhanced mobile broadband (eMBB) 5G operations. Such standards are directed to exploitation of the new NR waveform, in comparison with LTE-based license-assisted access (LAA)) waveform, and support of standalone deployment of NR-U, in comparison with the carrier aggregation (CA)-based LAA.

In 3GPP Release 17 (Rel' 17) and beyond, work may begin on 6 GHz access. It is expected that Rel' 17 and beyond may provide quality of service (QoS) for new-rising vertical domains that is at least better than WiFi QoS and also better than the QoS projected for availability in NR-U Rel' 16 operations. In order to implement such an increase in QoS, an advanced or sophisticated radio resource management (RRM) may be developed. Such an advanced RRM may embrace machine-learning processes, such as deep reinforced learning (DRL), to solve RRM problems more efficiently and more effectively. However, for any such advanced RRM schemes, the available measurements will drive the resulting performance.

One of the aspects of measurements is to evaluate how busy a particular channel is. Specifically, a measurement report in this regard can be used by the network to adjust various channel access-related parameters, such as the contention window size for load-based equipment (LBE) and the fixed-frame period for frame-based equipment (FBE). The network may further choose specific operational channel(s) among candidates of base stations or decide a hand-over target of a connected mode UE using such measurement. A UE can used the measurement to choose which base station to associate with while in idle mode.

The main measurement used in NR-U to evaluate how busy a channel is, as provided in Rel' 16, is the radio signal strength indicator (RSSI) (the average value and occupancy ratio), which is inherited from LAA. A UE can be configured to measure and report the average RSSI and channel occupancy, identified as a percentage of measurement samples where the RSSI value is above a threshold, during a reporting interval. However, such a measurement report provides an indirect indication of the channel use which may be too coarse of a measurement to result in a reliable use/congestion indication. Such an RSSI-based measurement does not indicate whether the channel occupancy is from one source or multiple sources. Moreover, it is currently defined at the granularity of OFDM symbol, which could be larger than the CCA slot (9 μs) for LBT-based channel access.

Another known measurement report design provides for a list of surrounding or neighboring NR-U base stations, which can be used to infer or predict the level of channel use. However, while such a report may be useful for hand-over management, it is also an indirect indication on a coarse measurement scale. Such a list merely indicates how many potential competing nodes there are but does not indicate how busy the channel under consideration is. Within WiFi operations, another measurement report design is based on the short training field (STF) preamble detection. Such STF-preamble detection can be used to infer or predict the usage level based on nearby WiFi nodes. However, it fails to tell the whole picture in the presence of multiple NR-U operators. It could be possible to introduce a complementary measurement based on a low-complexity detection of NR-U signals or sequences, which signals or sequences are not yet available, but again, such solutions are indirect and coarsely indicated.

In or to facilitate the desired QoS for 6 GHz band access, a more direct and detailed usage measurement may be useful to implement the advanced RRM operations. The various aspects of the present disclosure are directed to enhanced measurements that provide a direct and detailed measurement of channel occupation and usage.

Figure 3:
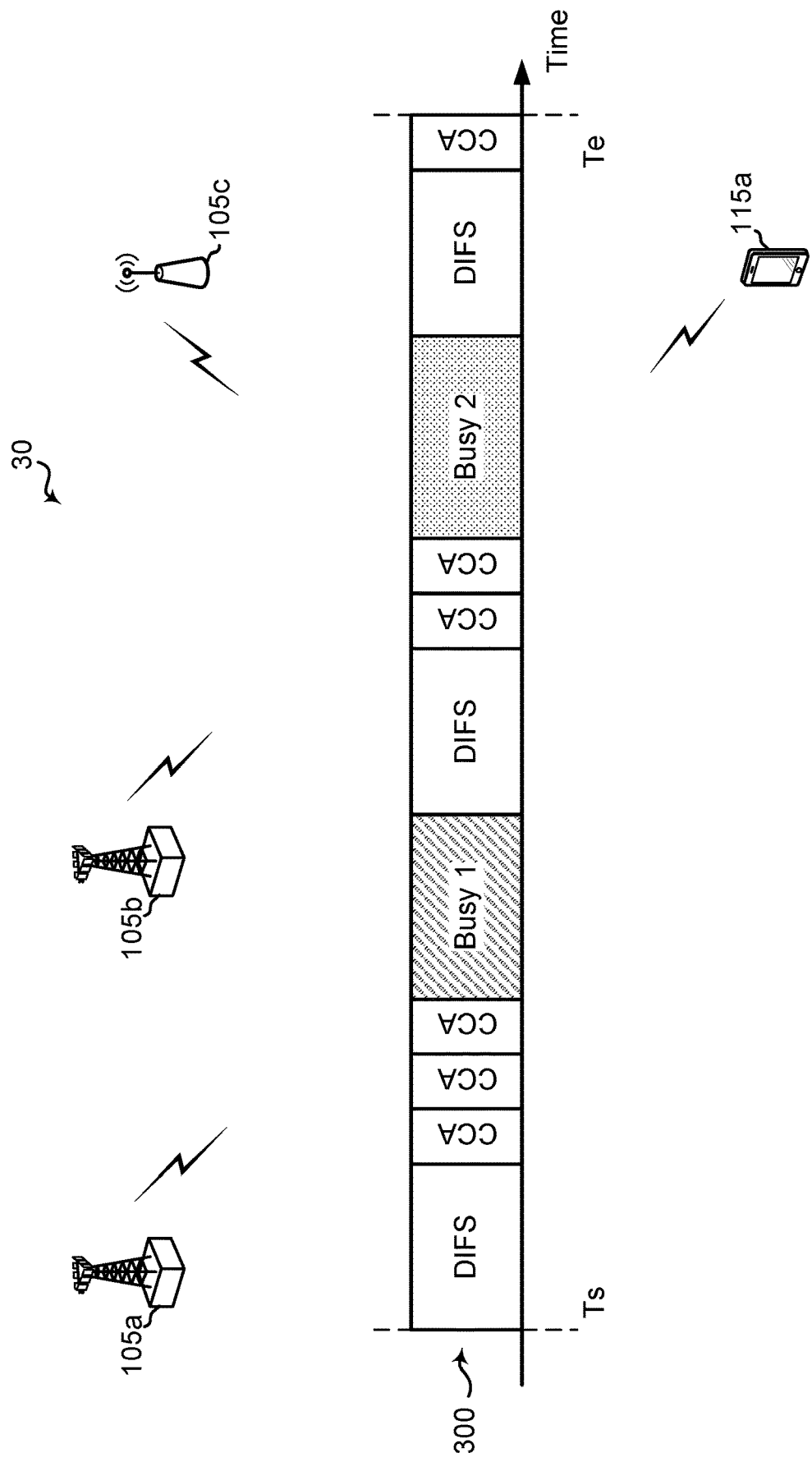
FIG. 3 is a block diagram illustrating a portion of NR-U network having multiple nodes contending for access to a shared communication channel and configured according to one aspect of the present disclosure.

FIG. 3 is a block diagram illustrating a portion of NR-U network 30 having multiple nodes, base stations 105a-105c and UE 115a, contending for access to a shared communication channel 300 and configured according to one aspect of the present disclosure. The enhanced measurement according to the various aspects of the present disclosure is based on parameters or statistics associated with LBT procedures conducted a UE, such as UE 115a, at the channel(s) and instant(s) specified by the network. Such LBT procedures may be configured for transmissions (e.g., scheduled transmissions or configured transmissions) or for measurement purposes (referred to as a "virtual LBT procedure"). UE 115a would conduct the configured LBT procedures and prepare a measurement report including the observations and measurements obtained during the LBT procedure. For example, UE 115a may perform a CAT 4 LBT that begins at time, Ts, and ends successfully at time, Te. According to the illustrated aspect, UE 115a would report enhanced measurement statistics to its serving base station, base station 105a, which may include the length of time for the CAT 4 LBT procedure (e.g., Te-Ts) it takes to check out a channel occupancy time (COT) for this specified CAT 4 LBT priority class, the number of additional distributed inter-frame spacings (DIFS's) the UE observed during the LBT procedure, and the like. The number of additional DIFS's observed can approximate the number of competing nodes.

It should be noted that, while three separate DIFS are depicted during the CAT 4 LBT of FIG. 3, the first DIFS is the period during which UE 115a detects no activity on shared communication channel 300. Once this DIFS period ends, UE 115a may attempt to access shared communication channel 300 via successive CCA checks. Because UE 115a encounters channel occupancies of the competing nodes, Busy 1, from access by base station 105b, and Busy 2, from access by base station 105c, the two additional DIFS are encountered by UE 115a when attempting the additional CCA checks for access. Thus, the first DIFS is part of the CAT 4 LBT procedure of UE 115a, the additional DIFS represent the approximation of the number of competing nodes (e.g., base station 105b and base station 105c).

Figure 4:
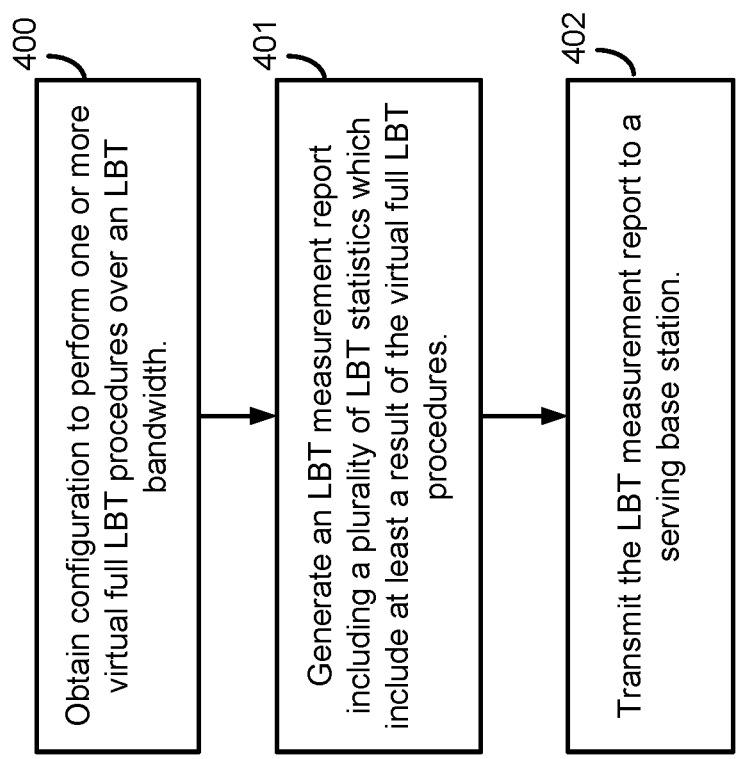
FIG. 4 is a block diagram illustrating example blocks executed to implement one aspect of the present disclosure.
Figure 9:
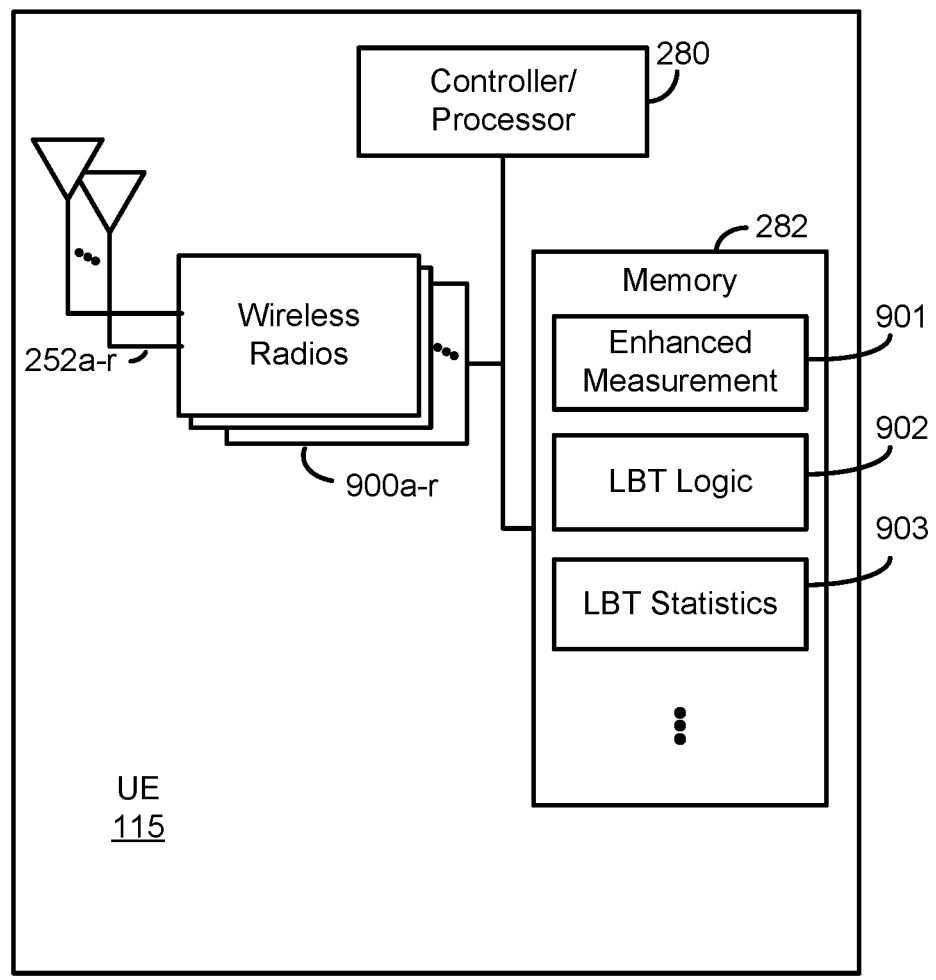
FIG. 9 is a block diagram illustrating an example UE configured according to one aspect of the present disclosure.

FIG. 4 is a block diagram illustrating example blocks executed to implement one aspect of the present disclosure. The example blocks will also be described with respect to UE 115 as illustrated in FIGS. 2 and 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 900a-r and antennas 252a-r. Wireless radios 900a-r includes various components and hardware, as illustrated in FIG. 2 for UE 115, including modulator/demodulators 254a-r, MIMO detector 256, receive processor 258, transmit processor 264, and TX MIMO processor 266.

At block 400, a UE obtains configuration to perform one or more virtual full LBT procedures over an LBT bandwidth. A UE capable of performing virtual LBT procedures, such as UE 115, may receive configuration information from the network via a serving base station over antennas 252a-r and wireless radios 900a-r. Upon detecting configuration of the virtual LBT procedures for measurement purposes, UE 115, under control of controller/processor 280, executes enhanced measurement logic 901, stored in memory 282. Execution of the instructions within enhanced measurement logic 901 provides the functionality and features of the enhanced measurement in the present description. The configuration information received from the base station is used within the environment established with execution of enhanced measurement logic 901 (referred to as "the execution environment" of enhanced measurement logic 901). The configuration directs UE 115 to the instants and channels to perform the full virtual LBT procedures along with the LBT parameters, such as energy detection (ED) threshold to use, and the like.

UE 115, under control of controller/processor 280, executes LBT logic 901, stored in memory 282, to perform the full virtual LBT procedures at the instants and channels directed by the configuration information using the parameters indicated in the configuration. The execution environment of LBT logic 901 provides the functionality for UE 115 to perform any various type of LBT procedure (e.g., CAT1, CAT2, CAT3, or CAT4) as directed by the current configuration.

At block 401, generates an LBT measurement report, wherein the LBT measurement report includes a plurality of LBT statistics including a result of the one or more virtual full LBT procedures. Upon completion of the configured full virtual LBT procedures, UE 115 compiles the LBT statistics, including the result of the LBT procedure, the time duration, the number of additional DIFS encountered, and the like. These are stored in memory 282 at LBT statistics 903. Within the execution environment of enhanced measurement logic 901, UE 115 uses the statistics from LBT statistics 903 to generate an enhanced LBT measurement report. UE 115 may be configured to report such LBT statistics in the enhanced report based on different criteria. For example, UE 115 may report after completing a predefined threshold of LBT procedures, for each LBT procedure completed within a predefined time window, or for some other criteria, such as after experiencing a predetermined number of "abnormal" LBT procedures, as defined in greater detail below.

At block 402, transmits the LBT measurement report to a serving base station. Once UE 115 generates the enhanced LBT measurement report, it may transmit the report to the serving base station via wireless radios 900a-r and antennas 252a-r.

Figure 5A:
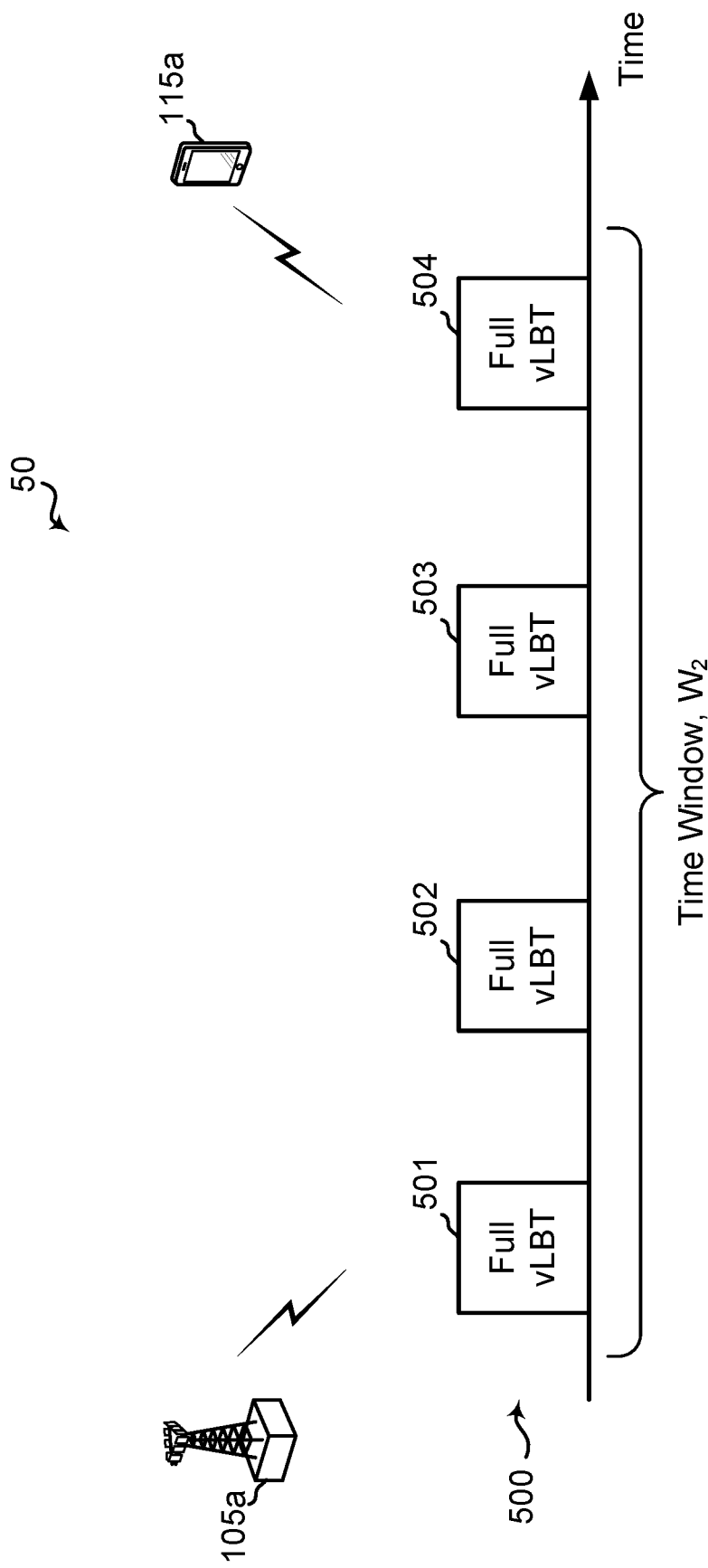
FIGS. 5A-5B are block diagrams illustrating a portion of NR-U network having a base station and UE configured for enhanced measurement according to one aspect of the present disclosure.

FIG. 5A is a block diagram illustrating a portion of NR-U network 50 having a base station 105a and UE 105a configured for enhanced measurement according to one aspect of the present disclosure. Base station 105a serves UE 115a with communications available via shared communication channel 500. The network may configure UE 115a, via base station 105a, to perform full virtual LBT procedures (Full vLBT) at various predetermined intervals. A full LBT procedure may include a CAT 3 LBT or CAT 4 LBT. Each full virtual LBT procedure may proceed similarly to the CAT 4 LBT procedure illustrated in FIG. 3. For example, at a beginning time, Te, UE 115a may initiate the full virtual LBT procedure by waiting for inactivity over a DIFS before attempting access with CCA instances on shared communication channel 500. UE 115a may either obtain access after the CCA instances or encounter channel usage from competing nodes by detecting busy periods and additional DIFS. The full virtual LBT procedure may ultimately either succeed, after which UE 115a would secure a COT on shared communication channel 500, or fail.

UE 115a can be configured to measure and report the LBT statistics on each full virtual LBT procedure over an LBT bandwidth (e.g., 20 MHz in the 5 GHz band) for a specific LBT priority class. The LBT statistics may include time duration of the LBT procedure, number of DIFS's experienced, and whether the LBT procedure is successful or failed. NR-U UEs configured under Rel' 16 may define LBT failure when the UE fails to check out a COT at a specific instant or a limited set of specific instants. For NR-U UEs configured under Rel' 17 and beyond, where true "floating" starting point uplink COTs may be specified, such UEs may define LBT failure as spending a duration longer than a threshold time before being able to check out a COT.

It should be noted that each full virtual LBT procedure may be configured similarly to a base station-like LBT procedure, even when a floating starting-point is not specified for a UE-initiated COT.

In one example implementation of the present aspect, UE 115a can be configured to report the LBT statistics to base station 105a after a threshold number of full virtual LBT procedures for a specific LBT priority class or combination of LBT priority classes over an LBT bandwidth on shared communication channel 500. According to the described example, if UE 115a were configured to report the LBT statistics after three completed full virtual LBT procedures, UE 115a would conduct full vLBTs 501-503 and then generate and transmit the report of LBT statistics after completion of full vLBT 503.

In another example implementation of the present aspect, UE 115a may be configured to report the LBT statistics observed within a predefined time window for a specific LBT priority class or combination of LBT priority classes over the LBT bandwidth. The predefined time window may be periodically configured or reconfigured by the network via signaling from base station 105a. In such an example implementation, base station 105a configures UE 115a with a time window, $W_2$, via signaling (not shown). UE 115*a* compiles the LBT statistics for full vLBTs 501-504 and reports these LBT statistics to base station 105*a* after the time window, $W_2$.

It should be noted that another optional example aspect may provide a low signaling overhead alternative, in which UE 115*a* can be configured to report the number of successfully checked-out virtual COTs, either back-to-back virtual COTS or within a defined interval, such as time window, $W_2$, for example.

The use of virtual LBT procedures for measurement purposes may also allow for expanding the parameters used for conducting the LBT. For example, UE 115*a* may be configured to use an energy detection (ED) threshold that is not linked to the maximum transmit power of UE 115*a*, as transmission-based LBT procedures typically are. In such example aspects, UE 115*a*, with 18 dBm maximum transmit power, can be configured to use −72 dBm, which corresponds to a 23 dBm transmit power, as the ED threshold over the LBT bandwidth (e.g., 20 MHz at 5 GHz). Thus, UE 115*a* would be conducting such measurements using the configuration of a different UE type or even a base station. Thus, UE 115*a* may be configured to use parameters for the virtual LBT procedures that are not specified for UE 115*a*. UE 115*a* could, therefore, be configured to execute a virtual LBT procedure using a CW_max=64 instead of CW_max=1024, which would be the configuration for actual data transmission of the same LBT priority class. Such a measurement could be configured for UE 115*a* to conduct on behalf of another UE or a base station.

Additional aspects of the illustrated example may configure the virtual LBT procedures to be directional, such as through analog beamforming. For example, full vLBT 501 may be configured for a first direction, while full vLBT 502-504 may each be configured for different directions or sets of directions.

As indicated in the various example aspects and example implementations, the ability of UE 115*a* to support virtual LBT procedures may be reported to base station 105*a* as a part of a capability report. Thus, UE 115*a* reports that it is capable of performing virtual LBT procedures and can then receive configuration information to configure the virtual LBT procedures and reporting information.

Figure 5B:
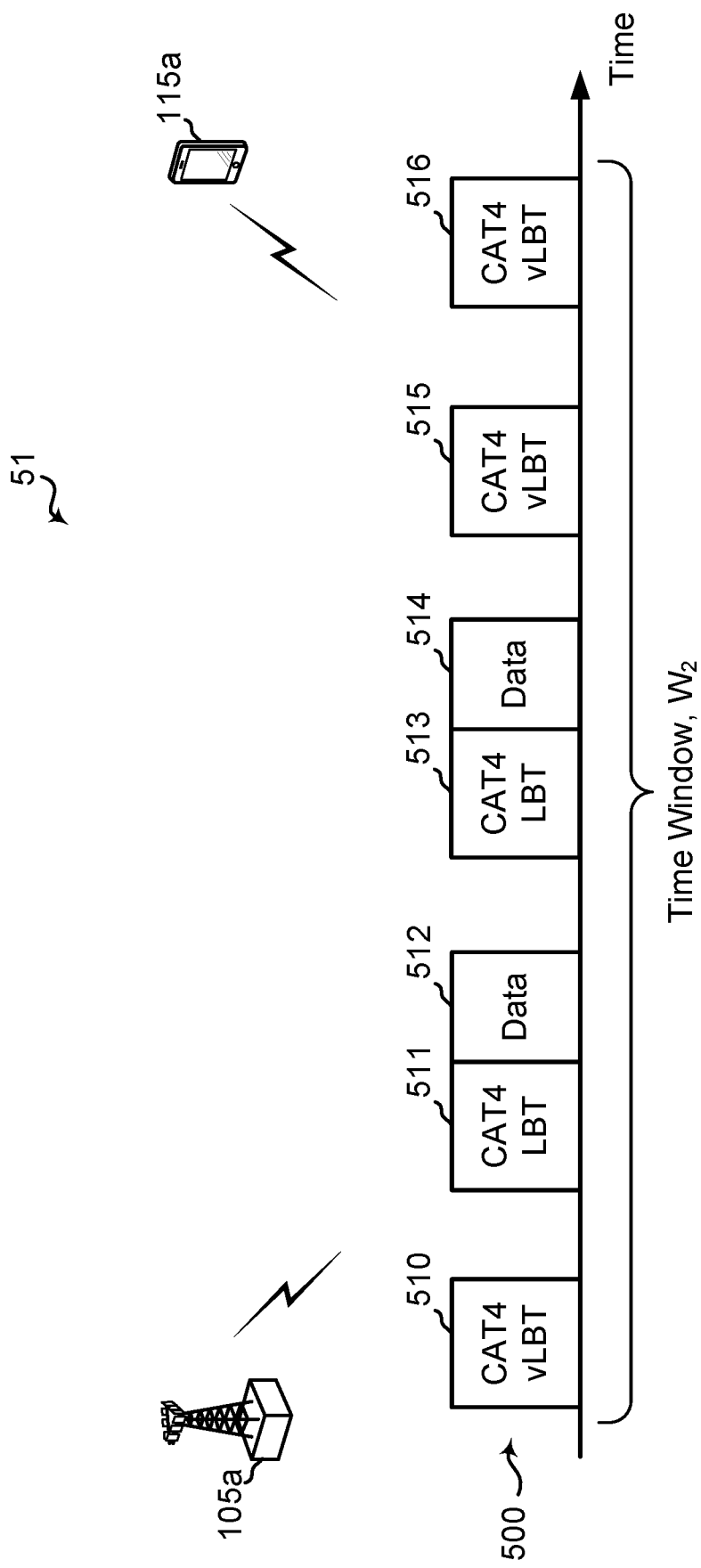

FIG. 5B is a block diagram illustrating a portion of NR-U network 51 having a base station 105*a* and UE 105*a* configured for enhanced measurement according to one aspect of the present disclosure. Base station 105*a* serves UE 115*a* with communications available via shared communication channel 500. In addition to configuration of UE 115*a* to perform full virtual LBT procedures for measurement purposes, the aspect illustrated in FIG. 5B may also provide for UE 115*a* to compile LBT statistics for the enhanced measurement report using transmission-based LBT procedures, such as for scheduled uplink transmissions and configured uplink transmissions. According to the illustrated aspect, UE 115*a* conducts virtual LBT procedures, CAT 4 vLBTs 510, 515, and 516, as configured by the network, as well as conducting a scheduled uplink transmission LBT procedure, CAT 4 LBT 511, after which uplink data 512 is transmitted, and a configured uplink transmission LBT procedure, CAT 4 LBT 513, after which uplink data 514 is autonomously transmitted by UE 115*a*. UE 115*a* may compile the LBT statistics using some or all of these LBT procedures, as configured by the network.

In one example implementation, UE 115*a* can be configured to transmit the enhanced measurement report after it has completed a predefined number of any LBT procedure or specifically of transmission LBT procedures. For example, if UE 115*a* is configured to report after two of any LBT procedures, it will perform CAT4 vLBT 510 and CAT4 LBT 511, and then compile and transmit the enhanced measurement report using the LBT statistics observed in CAT4 vLBT 510 and CAT4 LBT 511 after data transmission 512. If UE 115*a* is configured to report after two transmission LBT procedures, it will perform CAT4 vLBT 510, CAT4 LBT 511, and CAT4 LBT 513, and then compile and transmit the enhanced measurement report using the LBT statistics observed in CAT4 vLBT 510, CAT4 LBT 511 (scheduled transmission), and CAT4 LBT 513 (configured transmission) after data transmission 514. As indicated above, the LBT procedures used for compiling the LBT statistics may be limited to a specified LBT priority class or combination of LBT priority classes.

In another example implementation, UE 115*a* can be configured to transmit the enhanced measurement report for LBT procedures completed over a predefined time window, $W_2$, as described above. Thus, UE 115*a* would compile and transmit the enhanced measurement report of LBT statistics for each of the LBT procedures, virtual LBT procedures, CAT 4 vLBTs 510, 515, and 516, as well as transmission LBT procedures CAT 4 LBT 511 and 513, performed within time window, $W_2$.

In a further example implementation, UE 115*a* may be configured to compile the enhanced measurement report after it has experienced a predefined number of "abnormal" LBTs within a the time window, $W_2$. The abnormal LBTs may be performed for a specified LBT priority class or a combination of LBT priority classes. An "abnormal" LBT procedure may be defined as an LBT failure, or a successful LBT that exceeded the predefined LBT duration, or a successful LBT that exceeds a predefined number of DIFS's, or a combination of above. For example, UE 115*a* may be configured to compile and report the enhanced measurement report after experiencing two abnormal LBTs over time window, $W_2$. In performing CAT4 LBT 510, UE 115*a* detects that the LBT procedure failed. UE 115*a* performs CAT4 LBT 511 and data transmission 512 without an abnormal occurrence. However, CAT4 LBT 513 passes, which allows UE 115*a* to perform data transmissions 514, but the LBT passes after exceeding either the predefined LBT duration or predefined number of DIFS observed. Accordingly, UE 115*a* compiles the enhanced measurement report with LBT statistics for CAT4 vLBT 510, CAT4 LBT 511, and CAT4 LBT 513 and transmits the enhanced measurement report to base station 105*a* thereafter.

Figure 6A:
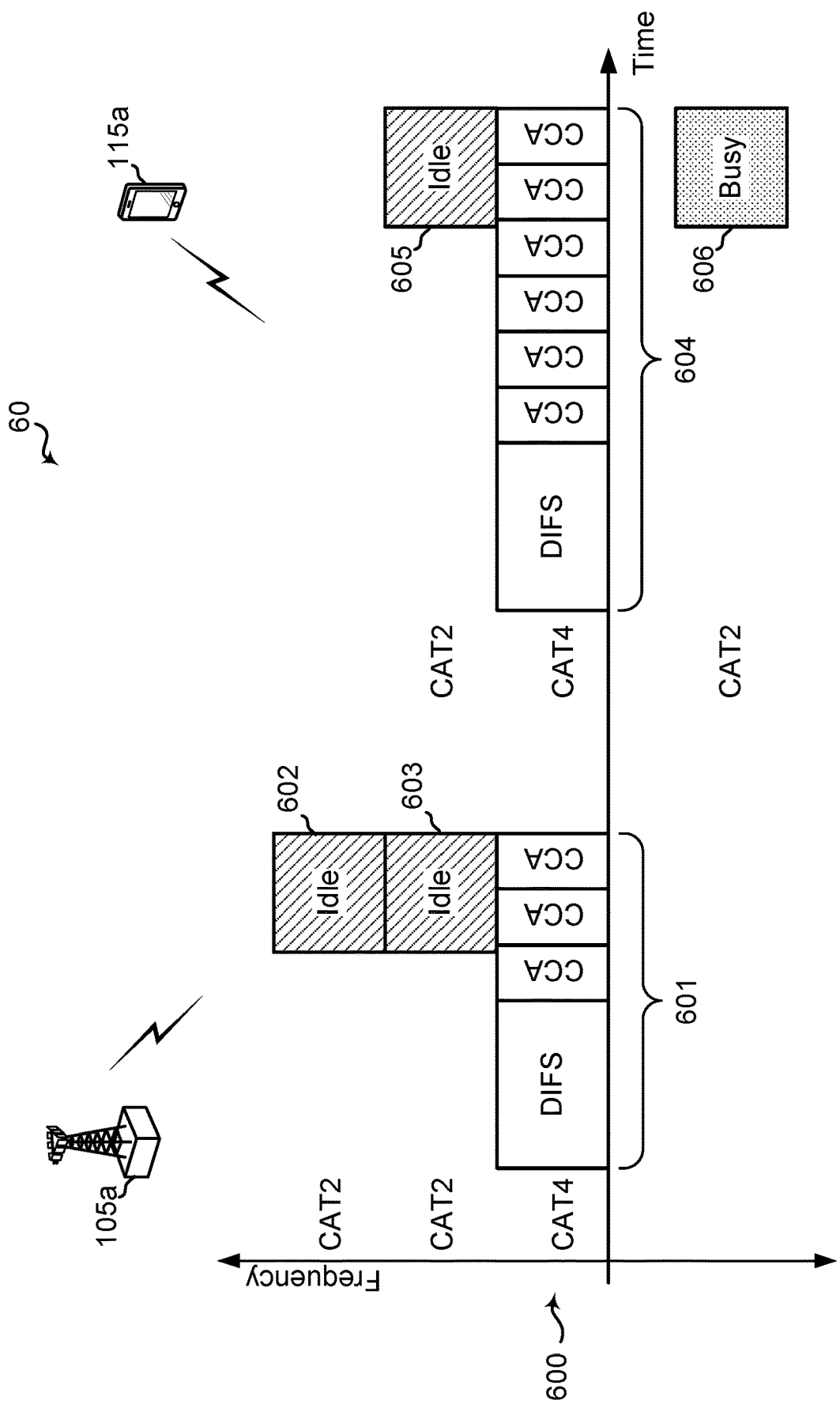
FIGS. 6A-6B are block diagrams illustrating a portion of NR-U network having a base station and UE configured for enhanced measurement according to one aspect of the present disclosure.

FIG. 6A is a block diagram illustrating a portion of NR-U network 60 having a base station 105*a* and UE 105*a* configured for enhanced measurement according to one aspect of the present disclosure. Base station 105*a* serves UE 115*a* with communications available via shared communication channel 600. In addition to providing LBT statistics for the LBT bandwidth of shared communication channel 600, additional aspects of the present disclosure may further provide enhanced measurements of additional candidate channels via LBT statistics. For example, UE 115*a* may perform full virtual LBT procedures 601 and 604 in the LBT bandwidth of shared communication channel 600 and abbreviated LBT procedures 602, 603, 605, and 606 on different candidate channels. Based on the reporting configuration, such as described above, when the reporting trigger is observed, UE 115*a* will compile the enhanced measurement report using the LBT statistics for the full virtual LBT procedures 601 and 604 for the shared communication channel 600 as well as for the abbreviated LBT procedures 602, 603, 605, and 606 for the different candidate channels.

Figure 6B:
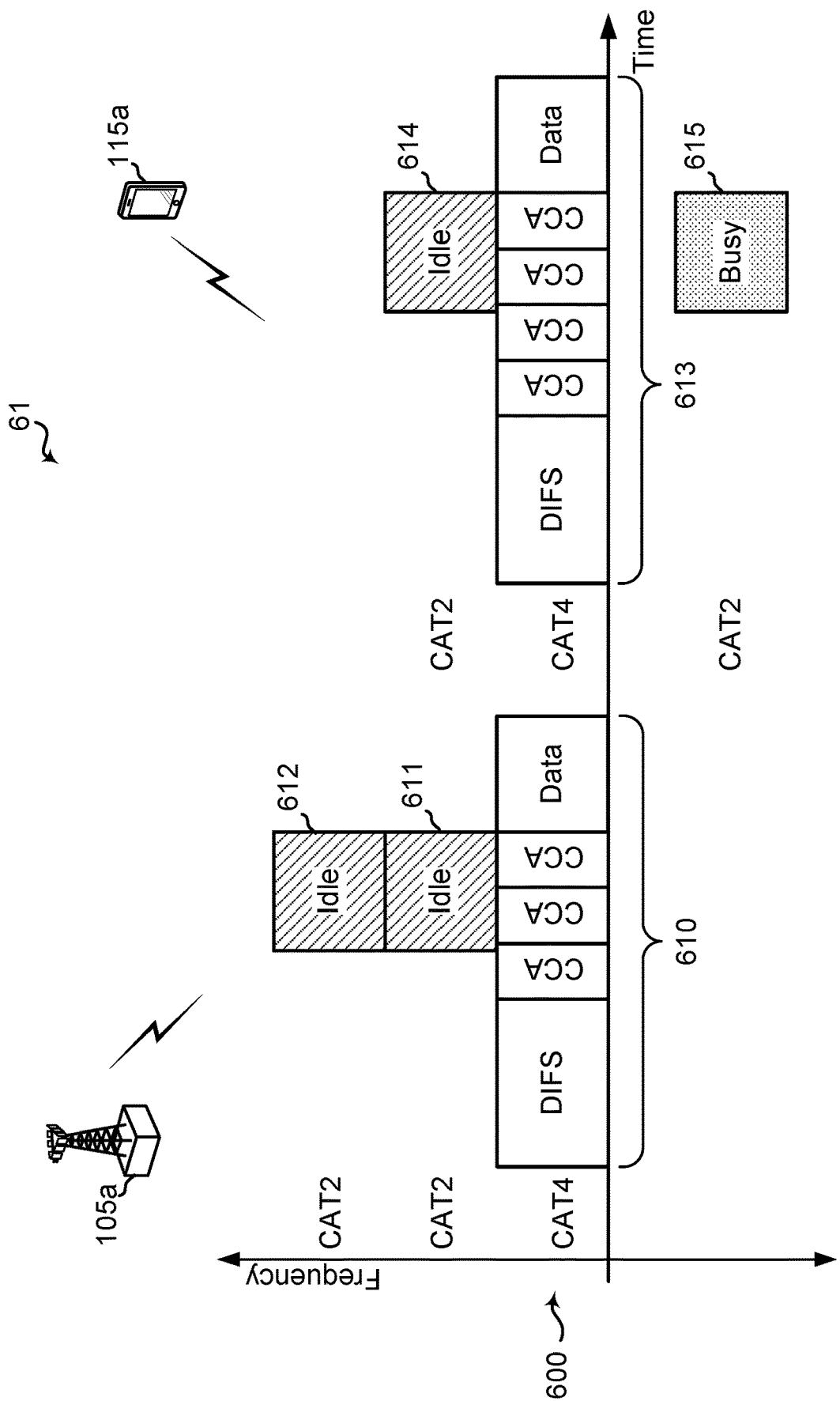

FIG. 6B is a block diagram illustrating a portion of NR-U network 60 having a base station 105a and UE 105a configured for enhanced measurement according to one aspect of the present disclosure. Whereas the additional abbreviated LBT procedures performed in the example aspect illustrated in FIG. 6A were anchored to virtual LBT procedures 601 and 604, additional aspects of the present disclosure may anchor the additional abbreviated LBT procedures to transmission LBT procedures. Accordingly, UE 115a may be configured to perform additional abbreviated LBT procedures 611, 612, 614, and 615 anchored to full transmission LBT procedures 610 and 613.

It should be noted that, as referenced above, full LBT procedures may include both CAT3 and CAT4 LBT procedures, while an abbreviated LBT procedure may include either of the 25 µs or 16 µs version of the CAT2 LBT procedure.

With respect to the illustrated aspects in FIGS. 6A and 6B, UE 115a may be configured to conduct the abbreviated LBT procedures at instants that are dynamically indicated through downlink control indicator (DCI) message received from base station 105a or other neighboring base stations (not shown), where the channels for UE 115a to conduct the abbreviated LBT procedures are different from the channel on which UE 115a receives the DCI message. Additionally, the DCI may configure UE 115a to use a different energy detection (ED) threshold for the abbreviated LBT procedure than the ED threshold typically determined by the maximum transmit power of UE 115a. The additional LBT statistics for the other candidate channels may be used by the network to adaptively switch to new operational channels.

Figure 7:
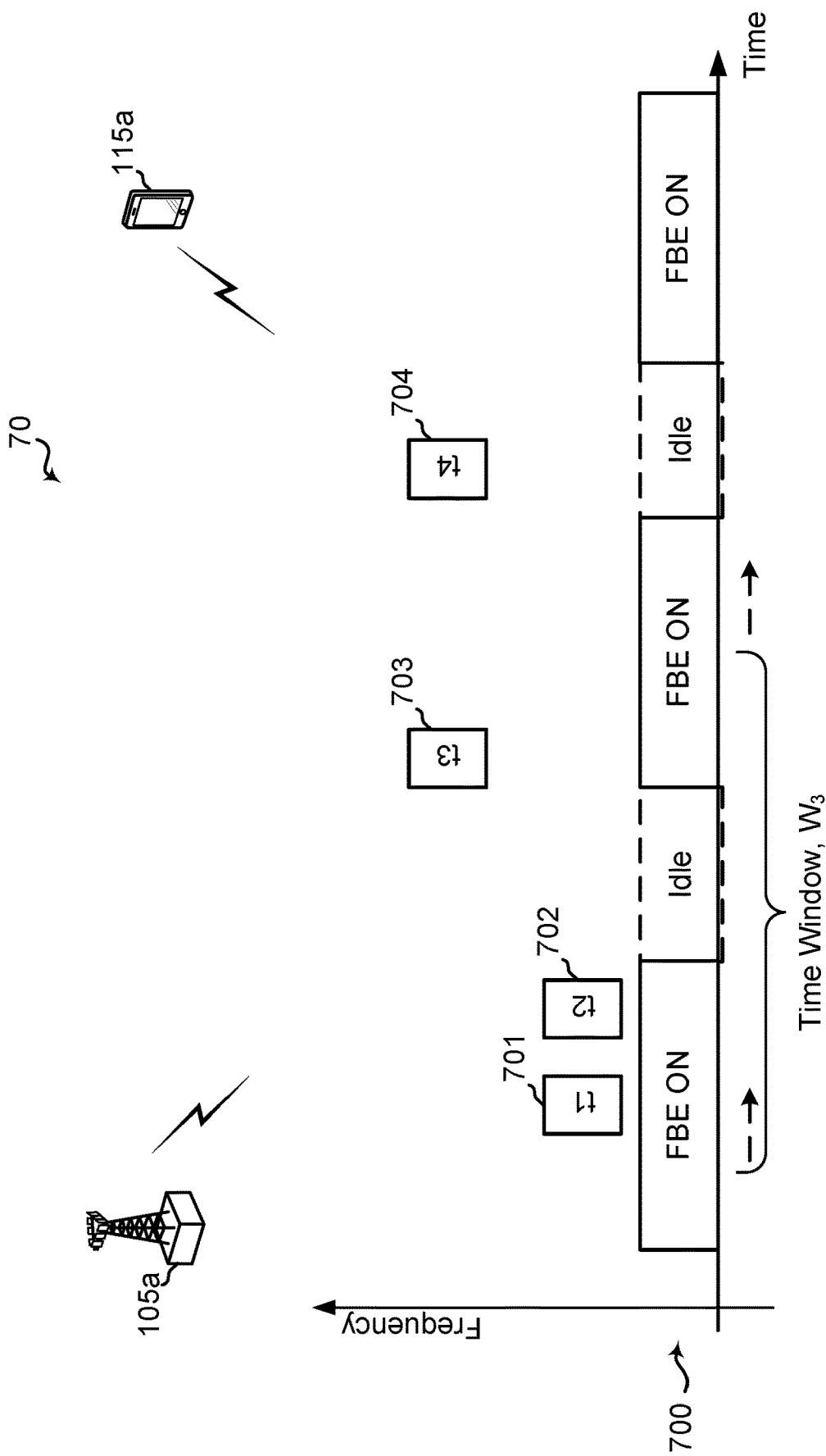
FIG. 7 is a block diagram illustrating a portion of NR-U network having a base station and UE configured for enhanced measurement according to one aspect of the present disclosure.

FIG. 7 is a block diagram illustrating a portion of NR-U network 70 having a base station 105a and UE 105a configured for enhanced measurement according to one aspect of the present disclosure. Base station 105a serves UE 115a with communications available via shared communication channel 700. When operating in a frame-based equipment (FBE) environment, UE 115a can be configured to conduct virtual FBE LBT procedures 701-704 in specific instants (t1-t4) and channels. UE 115a may further be configured with corresponding ED thresholds for such virtual FBE LBT procedures 701-704. Once conducted, UE 115a may compile the LBT statistics into the enhanced measurement report and transmit to base station 105a. As shown in FIG. 7, virtual FBE LBT procedures 701 and 702 are performed at t1 and t2 during the first FBE "on" interval, virtual FBE LBT procedure 703 is performed at t3 during the second FBE "on" interval, and virtual FBE LBT procedure 704 is performed at t4 during the second "idle" interval. UE 115a may then compile the LBT statistics from each of virtual FBE LBT procedures 701-704 and transmit to base station 105a in an enhanced measurement report.

It should be noted that UE 115a can also be configured to report LBT success ratios, as a moving-average over a sliding predefined measurement window, $W_3$, or a corresponding infinite impulse response (IIR) filtering.

Figure 8:
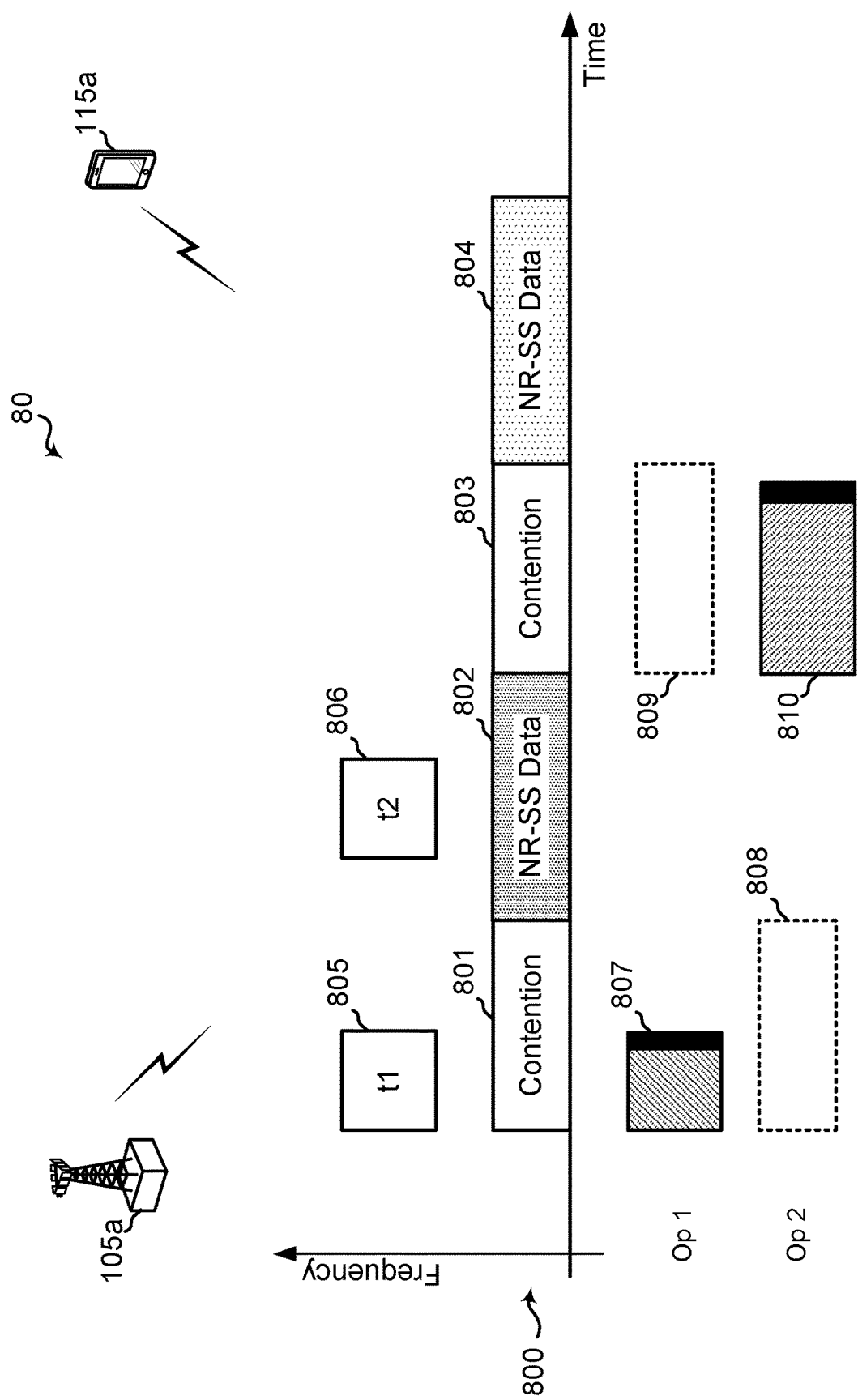
FIG. 8 is a block diagram illustrating a portion of NR-spectrum sharing (NR-SS) network having a base station and UE configured for enhanced measurement according to one aspect of the present disclosure.

FIG. 8 is a block diagram illustrating a portion of NR-spectrum sharing (NR-SS) network 80 having a base station 105a and UE 105a configured for enhanced measurement according to one aspect of the present disclosure. Base station 105a serves UE 115a with communications available via shared communication channel 800. When operating in an NR-SS environment, UE 115a can be configured to conduct virtual NR-SS LBT procedures 805-806 in specific instants (t1 and t2) and channels. UE 115a may further be configured with corresponding ED thresholds and LBT contention window sizes for such virtual NR-SS LBT procedures 805-806. Once conducted, UE 115a may compile the LBT statistics into the enhanced measurement report and transmit to base station 105a.

As shown in FIG. 8, virtual NR-SS LBT procedures 801 is performed at t1 during contention interval 801, while virtual NR-SS LBT procedure 802 is performed at t2 during NR-SS data transmission 802. UE 115a may then compile the LBT statistics from each of virtual NR-SS LBT procedures 805-806 and transmit to base station 105a in an enhanced measurement report. An NR-SS LBT is successful when no reservation (e.g., energy or message detection) is identified within the LBT contention window (contention intervals 801 and 803). Within NR-SS network 80, operator 1 has priority for transmissions within the first NR-SS COT (e.g., contention interval 801 and NR-SS data transmission 802), while operator 2 has priority for transmissions within the second NR-SS COT (e.g., contention interval 803 and NR-SS data transmission 804. For example, within contention interval 801, the node of operator 1 may conduct reservation procedure 807, while any competing nodes of operator 2 monitor 808 for opportunities to transmit where operator 1 does not check-out a COT. Similarly, within contention interval 803, wherein operator 2 has priority, the node of operator 2 conducts reservation procedure 810, while any competing nodes of operator 1 monitor 809 for opportunities to transmit where operator 2 does not check-out a COT.

It should be noted that, as with the example aspects of operation with FBE, UE 115a can also be configured to report LBT success ratios within NR-SS network 80, as a moving-average over a sliding predefined measurement window, $W_3$, or a corresponding infinite impulse response (IIR) filtering.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 4 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspects of the present disclosure may be implemented in many different ways, including methods, processes, non-transitory computer-readable medium having program code recorded thereon, apparatus having one or more processors with configurations and instructions for performing the described features and functionality, and the like. A first aspect of wireless communication may include obtaining, by a UE, a configuration to perform one or more virtual full LBT procedures over an LBT bandwidth; generating, by the UE, an LBT measurement report, wherein the LBT measurement report includes a plurality of LBT statistics including a result of the one or more virtual full LBT procedures; and transmitting, by the UE, the LBT measurement report to a serving base station.

In a second aspect, alone or in combination with the first aspect, further including performing, by the UE, one or more transmission LBT procedures over the LBT bandwidth, wherein the one or more transmission LBT procedures are performed in response to one or more of: a scheduled transmission and a configured transmission, wherein the plurality of LBT statistics of the LBT measurement report include one or more LBT statistics associated with the one or more transmission LBT procedures.

In a third aspect, alone or in combination with the second or first aspect, wherein LBT statistics include one or more of a time duration of each of the one or more virtual full LBT procedures and the one or more transmission LBT procedures; a number of DIFS periods experienced by the UE during the time duration; and a number of successfully checked-out virtual COTs, wherein the number of successfully checked-out virtual COTs reflects one of: a number of consecutive successfully checked-out virtual COTs or a total number of successfully checked-out COTs over a predefined interval.

In a fourth aspect, alone or in combination with one or more of the first aspect through the third aspect, wherein the transmitting is performed one of upon completion by the UE of a minimum threshold number of one or both of the one or more virtual full LBT procedures and the one or more transmission LBT procedures; upon detecting by the UE a minimum abnormal threshold number of abnormal LBT results of one or both of the one or more virtual full LBT procedures and the one or more transmission LBT procedures over a predefined time window; or upon expiration of the predefined time window.

In the fifth aspect, alone or in combination with one or more of the first aspect through the fourth aspect, wherein the one or more virtual full LBT procedures and the one or more transmission LBT procedures are associated with one of: a specific LBT priority class or a combination of LBT priority classes.

In the sixth aspect, alone or in combination with one or more of the first aspect through the fifth aspect, wherein the abnormal LBT results include one or more of: a failure detected in one of the one or more virtual full LBT procedures and the one or more transmission LBT procedures; a successful LBT procedure of the one or more virtual full LBT procedures or the one or more transmission LBT procedures that exceeds a predefined LBT procedure duration; or the successful LBT procedure of the one or more virtual full LBT procedures or the one or more transmission LBT procedures in which a number of distributed inter-frame spacing (DIFS) periods experienced by the UE exceeds a predefined threshold number of DIFS.

In the seventh aspect, alone or in combination with one or more of the first aspect through the sixth aspect, wherein the configuration further configures the UE to perform a virtual abbreviated LBT procedure on one or more candidate channels outside of a current channel within the LBT bandwidth.

In an eighth aspect, alone or in combination with one or more of the first aspect through the seventh aspect, wherein the one or more candidate channels are contiguously adjacent to one of the one or more virtual full LBT procedures; or the one or more transmission LBT procedures; over the LBT bandwidth.

In a ninth aspect, alone or in combination with one or more of the first aspect through the eighth aspect, further including receiving, by the UE, DCI including a virtual abbreviated LBT configuration; performing, by the UE, one or more abbreviated virtual LBT procedures at an instant and channel indicated by the virtual abbreviated LBT configuration, wherein the channel indicated by the virtual abbreviated LBT configuration is different from a receive channel on which the DCI is received.

In a tenth aspect, alone or in combination with one or more of the first aspect through the ninth aspect, wherein the configuration includes a set of time instants over a FBE set of frames over the LBT bandwidth during which the one or more virtual full LBT procedures are to be performed; one or more channels on which the one or more virtual full LBT procedures are to be performed; and an energy detection threshold for the one or more virtual full LBT procedures, wherein the energy detection threshold is one of linked to a maximum transmit power of the UE or unlinked to the maximum transmit power.

In an eleventh aspect, alone or in combination with one or more of the first aspect through the tenth aspect, wherein the plurality of LBT statistics includes an LBT success ratio of the one or more virtual full LBT procedures over a predefined sliding measurement window.

In a twelfth aspect, alone or in combination with one or more of the first aspect through the eleventh aspect, wherein the configuration includes a set of time instants over the LBT bandwidth of a NR-SS operation during which the one or more virtual full LBT procedures are to be performed; one or more channels on which the one or more virtual full LBT procedures are to be performed; and an energy detection threshold for the one or more virtual full LBT procedures, wherein the energy detection threshold is one of linked to a maximum transmit power of the UE or unlinked to the maximum transmit power.

In a thirteenth aspect, alone or in combination with one or more of the first aspect through the twelfth aspect, wherein the plurality of LBT statistics includes an LBT success ratio of the one or more virtual full LBT procedures over a predefined sliding measurement window.

In a fourteenth aspect, alone or in combination with one or more of the first aspect through the thirteenth aspect, wherein the configuration includes one or more of an energy detection threshold for the one or more virtual full LBT procedures, wherein the energy detection threshold is one of linked to a maximum transmit power of the UE or unlinked to the maximum transmit power; one or more LBT parameters associated with a network device type other than a UE type of the UE; and a beamforming direction that identifies a direction to perform the one or more virtual full LBT procedures.

In a fifteenth aspect, alone or in combination with one or more of the first aspect through the fourteenth aspect, further including transmitting, by the UE, a capabilities message to the serving base station, wherein the capabilities message includes a capability of the UE for use of virtual LBT procedures.

A sixteenth aspect configured for wireless communication may include means for obtaining, by a UE, a configuration to perform one or more virtual full LBT procedures over an LBT bandwidth; means for generating, by the UE, an LBT measurement report, wherein the LBT measurement report includes a plurality of LBT statistics including a result of the one or more virtual full LBT procedures; and means for transmitting, by the UE, the LBT measurement report to a serving base station.

In a seventeenth aspect, alone or in combination with the sixteenth aspect, further including means for performing, by the UE, one or more transmission LBT procedures over the LBT bandwidth, wherein the one or more transmission LBT procedures are performed in response to one or more of: a scheduled transmission and a configured transmission, wherein the plurality of LBT statistics of the LBT measurement report include one or more LBT statistics associated with the one or more transmission LBT procedures.

In an eighteenth aspect, alone or in combination with one or more of the sixteenth aspect and the seventeenth aspect, wherein LBT statistics include one or more of a time duration of each of the one or more virtual full LBT procedures and the one or more transmission LBT procedures; a number of DIFS periods experienced by the UE during the time duration; and a number of successfully checked-out virtual COTs, wherein the number of successfully checked-out virtual COTs reflects one of: a number of consecutive successfully checked-out virtual COTs or a total number of successfully checked-out COTs over a predefined interval.

In a nineteenth aspect, alone or in combination with one or more of the sixteenth aspect through the eighteenth aspect, wherein the means for transmitting is performed one of upon completion by the UE of a minimum threshold number of one or both of the one or more virtual full LBT procedures and the one or more transmission LBT procedures; upon detecting by the UE a minimum abnormal threshold number of abnormal LBT results of one or both of the one or more virtual full LBT procedures and the one or more transmission LBT procedures over a predefined time window; or upon expiration of the predefined time window.

In a twentieth aspect, alone or in combination with one or more of the sixteenth aspect through the nineteenth aspect, wherein the one or more virtual full LBT procedures and the one or more transmission LBT procedures are associated with one of: a specific LBT priority class or a combination of LBT priority classes.

In a twenty-first aspect, alone or in combination with one or more of the sixteenth aspect through the twentieth aspect, wherein the abnormal LBT results include one or more of a failure detected in one of the one or more virtual full LBT procedures and the one or more transmission LBT procedures; a successful LBT procedure of the one or more virtual full LBT procedures or the one or more transmission LBT procedures that exceeds a predefined LBT procedure duration; or the successful LBT procedure of the one or more virtual full LBT procedures or the one or more transmission LBT procedures in which a number of DIFS periods experienced by the UE exceeds a predefined threshold number of DIFS.

In a twenty-second aspect, alone or in combination with one or more of the sixteenth aspect through the twenty-first aspect, wherein the configuration further configures the UE to perform a virtual abbreviated LBT procedure on one or more candidate channels outside of a current channel within the LBT bandwidth.

In a twenty-third aspect, alone or in combination with one or more of the sixteenth aspect through the twenty-second aspect, wherein the one or more candidate channels are contiguously adjacent to one of the one or more virtual full LBT procedures; or the one or more transmission LBT procedures; over the LBT bandwidth.

In a twenty-fourth aspect, alone or in combination with one or more of the sixteenth aspect through the twenty-third aspect, further including means for receiving, by the UE, DCI including a virtual abbreviated LBT configuration; means for performing, by the UE, one or more abbreviated virtual LBT procedures at an instant and channel indicated by the virtual abbreviated LBT configuration, wherein the channel indicated by the virtual abbreviated LBT configuration is different from a receive channel on which the DCI is received.

In a twenty-fifth aspect, alone or in combination with one or more of the sixteenth aspect through the twenty-fourth aspect, wherein the configuration includes a set of time instants over a FBE set of frames over the LBT bandwidth during which the one or more virtual full LBT procedures are to be performed; one or more channels on which the one or more virtual full LBT procedures are to be performed; and an energy detection threshold for the one or more virtual full LBT procedures, wherein the energy detection threshold is one of linked to a maximum transmit power of the UE or unlinked to the maximum transmit power.

In a twenty-sixth aspect, alone or in combination with one or more of the sixteenth aspect through the twenty-fifth aspect, wherein the plurality of LBT statistics includes an LBT success ratio of the one or more virtual full LBT procedures over a predefined sliding measurement window.

In a twenty-seventh aspect, alone or in combination with one or more of the sixteenth aspect through the twenty-sixth aspect, wherein the configuration includes a set of time instants over the LBT bandwidth of a NR-SS operation during which the one or more virtual full LBT procedures are to be performed; one or more channels on which the one or more virtual full LBT procedures are to be performed; and an energy detection threshold for the one or more virtual full LBT procedures, wherein the energy detection threshold is one of linked to a maximum transmit power of the UE or unlinked to the maximum transmit power.

In a twenty-eighth aspect, alone or in combination with one or more of the sixteenth aspect through the twenty-ninth aspect, wherein the plurality of LBT statistics includes an LBT success ratio of the one or more virtual full LBT procedures over a predefined sliding measurement window.

In a twenty-ninth aspect, alone or in combination with one or more of the sixteenth aspect through the twenty-eighth aspect, wherein the configuration includes one or more of an energy detection threshold for the one or more virtual full LBT procedures, wherein the energy detection threshold is one of linked to a maximum transmit power of the UE or unlinked to the maximum transmit power; one or more LBT parameters associated with a network device type other than a UE type of the UE; and a beamforming direction that identifies a direction to perform the one or more virtual full LBT procedures.

In a thirtieth aspect, alone or in combination with one or more of the sixteenth aspect through the twenty-ninth aspect, further including means for transmitting, by the UE, a capabilities message to the serving base station, wherein the capabilities message includes a capability of the UE for use of virtual LBT procedures.

A thirty-first aspect may include a non-transitory computer-readable medium having program code recorded thereon, where the program code may include program code executable by a computer for causing the computer to obtain, by a UE, a configuration to perform one or more virtual full LBT procedures over an LBT bandwidth; program code executable by the computer for causing the computer to generate, by the UE, an LBT measurement report, wherein the LBT measurement report includes a plurality of LBT statistics including a result of the one or more virtual full LBT procedures; and program code executable by the computer for causing the computer to transmit, by the UE, the LBT measurement report to a serving base station.

In a thirty-second aspect, alone or in combination with the thirty-first aspect, further including program code executable by the computer for causing the computer to perform, by the UE, one or more transmission LBT procedures over the LBT bandwidth, wherein the one or more transmission LBT procedures are performed in response to one or more of: a scheduled transmission and a configured transmission, wherein the plurality of LBT statistics of the LBT measurement report include one or more LBT statistics associated with the one or more transmission LBT procedures.

In a thirty-third aspect, alone or in combination with one or more of the thirty-second or thirty-first aspects, wherein LBT statistics include one or more of a time duration of each of the one or more virtual full LBT procedures and the one or more transmission LBT procedures; a number of DIFS periods experienced by the UE during the time duration; and a number of successfully checked-out virtual COTs, wherein the number of successfully checked-out virtual COTs reflects one of: a number of consecutive successfully checked-out virtual COTs or a total number of successfully checked-out COTs over a predefined interval.

In a thirty-fourth aspect, alone or in combination with one or more of the thirty-first aspect through the thirty-third aspect, wherein the program code executable by the computer for causing the computer to transmit is performed one of: upon completion by the UE of a minimum threshold number of one or both of the one or more virtual full LBT procedures and the one or more transmission LBT procedures; upon detecting by the UE a minimum abnormal threshold number of abnormal LBT results of one or both of the one or more virtual full LBT procedures and the one or more transmission LBT procedures over a predefined time window; or upon expiration of the predefined time window.

In a thirty-fifth aspect, alone or in combination with one or more of the thirty-first aspect through the thirty-fourth aspect, wherein the one or more virtual full LBT procedures and the one or more transmission LBT procedures are associated with one of: a specific LBT priority class or a combination of LBT priority classes.

In a thirty-sixth aspect, alone or in combination with one or more of the thirty-first aspect through the thirty-fifth aspect, wherein the abnormal LBT results include one or more of a failure detected in one of the one or more virtual full LBT procedures and the one or more transmission LBT procedures; a successful LBT procedure of the one or more virtual full LBT procedures or the one or more transmission LBT procedures that exceeds a predefined LBT procedure duration; or the successful LBT procedure of the one or more virtual full LBT procedures or the one or more transmission LBT procedures in which a number of DIFS periods experienced by the UE exceeds a predefined threshold number of DIFS.

In a thirty-seventh aspect, alone or in combination with one or more of the thirty-first aspect through the thirty-sixth aspect, wherein the configuration further configures the UE to perform a virtual abbreviated LBT procedure on one or more candidate channels outside of a current channel within the LBT bandwidth.

In a thirty-eighth aspect, alone or in combination with one or more of the thirty-first aspect through the thirty-seventh aspect, wherein the one or more candidate channels are contiguously adjacent to one of the one or more virtual full LBT procedures; or the one or more transmission LBT procedures; over the LBT bandwidth.

In a thirty-ninth aspect, alone or in combination with one or more of the thirty-first aspect through the thirty-eighth aspect, further including program code executable by the computer for causing the computer to receive, by the UE, DCI including a virtual abbreviated LBT configuration; program code executable by the computer for causing the computer to perform, by the UE, one or more abbreviated virtual LBT procedures at an instant and channel indicated by the virtual abbreviated LBT configuration, wherein the channel indicated by the virtual abbreviated LBT configuration is different from a receive channel on which the DCI is received.

In a fortieth aspect, alone or in combination with one or more of the thirty-first aspect through the thirty-ninth aspect, wherein the configuration includes a set of time instants over a FBE set of frames over the LBT bandwidth during which the one or more virtual full LBT procedures are to be performed; one or more channels on which the one or more virtual full LBT procedures are to be performed; and an energy detection threshold for the one or more virtual full LBT procedures, wherein the energy detection threshold is one of linked to a maximum transmit power of the UE or unlinked to the maximum transmit power.

In a forty-first aspect, alone or in combination with one or more of the thirty-first aspect through the fortieth aspect, wherein the plurality of LBT statistics includes an LBT success ratio of the one or more virtual full LBT procedures over a predefined sliding measurement window.

In a forty-second aspect, alone or in combination with one or more of the thirty-first aspect through the forty-first aspect, wherein the configuration includes a set of time instants over the LBT bandwidth of a NR-SS operation during which the one or more virtual full LBT procedures are to be performed; one or more channels on which the one or more virtual full LBT procedures are to be performed; and an energy detection threshold for the one or more virtual full LBT procedures, wherein the energy detection threshold is one of linked to a maximum transmit power of the UE or unlinked to the maximum transmit power.

In a forty-third aspect, alone or in combination with one or more of the thirty-first aspect through the forty-second aspect, wherein the plurality of LBT statistics includes an LBT success ratio of the one or more virtual full LBT procedures over a predefined sliding measurement window.

In a forty-fourth aspect, alone or in combination with one or more of the thirty-first aspect through the forty-third aspect, wherein the configuration includes one or more of an energy detection threshold for the one or more virtual full LBT procedures, wherein the energy detection threshold is one of linked to a maximum transmit power of the UE or unlinked to the maximum transmit power; one or more LBT parameters associated with a network device type other than a UE type of the UE; and a beamforming direction that identifies a direction to perform the one or more virtual full LBT procedures.

In a forty-fifth aspect, alone or in combination with one or more of the thirty-first aspect through the forty-fourth aspect, further including program code executable by the computer for causing the computer to transmit, by the UE, a capabilities message to the serving base station, wherein the capabilities message includes a capability of the UE for use of virtual LBT procedures.

A forty-sixth aspect configured for wireless communication may include at least one processor; and a memory coupled to the at least one processor, wherein the at least one processor may be configured to obtain, by a UE, a configuration to perform one or more virtual full LBT procedures over an LBT bandwidth; to generate, by the UE, an LBT measurement report, wherein the LBT measurement report includes a plurality of LBT statistics including a result of the one or more virtual full LBT procedures; and to transmit, by the UE, the LBT measurement report to a serving base station.

In a forty-seventh aspect, alone or in combination with the forty-sixth aspect, further including configuration of the at least one processor to perform, by the UE, one or more transmission LBT procedures over the LBT bandwidth, wherein the one or more transmission LBT procedures are performed in response to one or more of: a scheduled transmission and a configured transmission, wherein the plurality of LBT statistics of the LBT measurement report include one or more LBT statistics associated with the one or more transmission LBT procedures.

In a forty-eighth aspect, alone or in combination with the forty-sixty or forty-seventh aspects, wherein LBT statistics include one or more of a time duration of each of the one or more virtual full LBT procedures and the one or more transmission LBT procedures; a number of DIFS periods experienced by the UE during the time duration; and a number of successfully checked-out virtual channel occupancy times COTs, wherein the number of successfully checked-out virtual COTs reflects one of: a number of consecutive successfully checked-out virtual COTs or a total number of successfully checked-out COTs over a predefined interval.

In a forty-ninth aspect, alone or in combination with one or more of the forty-sixth aspect through the forty-eighth aspect, wherein the configuration of the at least one processor to transmit is performed one of upon completion by the UE of a minimum threshold number of one or both of the one or more virtual full LBT procedures and the one or more transmission LBT procedures; upon detecting by the UE a minimum abnormal threshold number of abnormal LBT results of one or both of the one or more virtual full LBT procedures and the one or more transmission LBT procedures over a predefined time window; or upon expiration of the predefined time window.

In a fiftieth aspect, alone or in combination with one or more of the forty-sixth aspect through the forty-ninth aspect, wherein the one or more virtual full LBT procedures and the one or more transmission LBT procedures are associated with one of: a specific LBT priority class or a combination of LBT priority classes.

In a fifty-first aspect, alone or in combination with one or more of the forty-sixth aspect through the fiftieth aspect, wherein the abnormal LBT results include one or more of a failure detected in one of the one or more virtual full LBT procedures and the one or more transmission LBT procedures; a successful LBT procedure of the one or more virtual full LBT procedures or the one or more transmission LBT procedures that exceeds a predefined LBT procedure duration; or the successful LBT procedure of the one or more virtual full LBT procedures or the one or more transmission LBT procedures in which a number of DIFS periods experienced by the UE exceeds a predefined threshold number of DIFS.

In a fifty-second aspect, alone or in combination with one or more of the forty-sixth aspect through the fifty-first aspect, wherein the configuration further configures the UE to perform a virtual abbreviated LBT procedure on one or more candidate channels outside of a current channel within the LBT bandwidth.

In a fifty-third aspect, alone or in combination with one or more of the forty-sixth aspect through the fifty-second aspect, wherein the one or more candidate channels are contiguously adjacent to one of the one or more virtual full LBT procedures; or the one or more transmission LBT procedures; over the LBT bandwidth.

In a fifty-fourth aspect, alone or in combination with one or more of the forty-sixth aspect through the fifty-fifth aspect, further including configuration of the at least one processor to receive, by the UE, DCI including a virtual abbreviated LBT configuration; to perform, by the UE, one or more abbreviated virtual LBT procedures at an instant and channel indicated by the virtual abbreviated LBT configuration, wherein the channel indicated by the virtual abbreviated LBT configuration is different from a receive channel on which the DCI is received.

In a fifty-fifth aspect, alone or in combination with one or more of the forty-sixth aspect through the fifty-fourth aspect, wherein the configuration includes a set of time instants over a FBE set of frames over the LBT bandwidth during which the one or more virtual full LBT procedures are to be performed; one or more channels on which the one or more virtual full LBT procedures are to be performed; and an energy detection threshold for the one or more virtual full LBT procedures, wherein the energy detection threshold is one of linked to a maximum transmit power of the UE or unlinked to the maximum transmit power.

In a fifty-sixth aspect, alone or in combination with one or more of the forty-sixth aspect through the fifty-fifth aspect, wherein the plurality of LBT statistics includes an LBT success ratio of the one or more virtual full LBT procedures over a predefined sliding measurement window.

In a fifty-seventh aspect, alone or in combination with one or more of the forty-sixth aspect through the fifty-sixth aspect, wherein the configuration includes a set of time instants over the LBT bandwidth of a NR-SS operation during which the one or more virtual full LBT procedures are to be performed; one or more channels on which the one or more virtual full LBT procedures are to be performed; and an energy detection threshold for the one or more virtual full LBT procedures, wherein the energy detection threshold is one of linked to a maximum transmit power of the UE or unlinked to the maximum transmit power.

In a fifty-eighth aspect, alone or in combination with one or more of the forty-sixth aspect through the fifty-seventh aspect, wherein the plurality of LBT statistics includes an LBT success ratio of the one or more virtual full LBT procedures over a predefined sliding measurement window.

In a fifty-ninth aspect, alone or in combination with one or more of the forty-sixth aspect through the fifty-eighth aspect, wherein the configuration includes one or more of an energy detection threshold for the one or more virtual full LBT procedures, wherein the energy detection threshold is one of linked to a maximum transmit power of the UE or unlinked to the maximum transmit power; one or more LBT parameters associated with a network device type other than a UE type of the UE; and a beamforming direction that identifies a direction to perform the one or more virtual full LBT procedures.

In a sixtieth aspect, alone or in combination with one or more of the forty-sixth aspect through the fifty-ninth aspect, further including configuration of the at least one processor to transmit, by the UE, a capabilities message to the serving base station, wherein the capabilities message includes a capability of the UE for use of virtual LBT procedures.

A sixty-first aspect configured for wireless communication may include configuring, by a base station, one or more virtual full LBT procedures for at least one served UE within an LBT bandwidth; signaling, by the base station, a configuration of the one or more virtual full LBT procedures to the at least one served UEs; receiving, by the base station, an LBT measurement report from the at least one served UEs, wherein the LBT measurement report includes a plurality of LBT statistics including a result of the one or more virtual full LBT procedures; and determining, by the base station, radio resource management of a connection with the at least one served UEs using the plurality of LBT statistics.

In a sixty-second aspect, alone or in combination with the sixty-first aspect, wherein the plurality of LBT statistics in the LBT measurement report further includes one or more LBT statistics associated with one or more transmission LBT procedures performed by the at least one served UE.

In a sixty-third aspect, alone or in combination with the sixty-second or sixty-first aspect, wherein LBT statistics include one or more of a time duration of each of the one or more virtual full LBT procedures and the one or more transmission LBT procedures; a number of DIFS periods experienced by the at least one served UE during the time duration; and a number of successfully checked-out virtual COTs, wherein the number of successfully checked-out virtual COTs reflects one of: a number of consecutive successfully checked-out virtual COTs or a total number of successfully checked-out COTs over a predefined interval.

In a sixty-fourth aspect, alone or in combination with one or more of the sixty-first aspect through the sixty-third aspect, wherein the one or more virtual full LBT procedures and the one or more transmission LBT procedures are associated with one of: a specific LBT priority class or a combination of LBT priority classes.

In a sixty-fifth aspect, alone or in combination with one or more of the sixty-first aspect through the sixty-fourth aspect, wherein the configuring further includes configuring for the at least one served UE a virtual abbreviated LBT procedure on one or more candidate channels outside of a current channel within the LBT bandwidth.

In a sixty-sixth aspect, alone or in combination with one or more of the sixty-first aspect through the sixty-fifth aspect, further including signaling, by the base station, downlink control information (DCI) including a virtual abbreviated LBT configuration, wherein the virtual abbreviated LBT configuration includes an instant and channel for the virtual abbreviated LBT procedure, wherein the channel is different from a transmit channel on which the DCI is signaled.

In a sixty-seventh aspect, alone or in combination with one or more of the sixty-first aspect through the sixty-sixth aspect, wherein the configuration includes a set of time instants over a FBE set of frames over the LBT bandwidth during which the one or more virtual full LBT procedures are to be performed; one or more channels on which the one or more virtual full LBT procedures are to be performed; and an energy detection threshold for the one or more virtual full LBT procedures, wherein the energy detection threshold is one of linked to a maximum transmit power of the at least one served UE or unlinked to the maximum transmit power.

In a sixty-eighth aspect, alone or in combination with one or more of the sixty-first aspect through the sixty-seventh aspect, wherein the plurality of LBT statistics includes an LBT success ratio of the one or more virtual full LBT procedures over a predefined sliding measurement window.

In a sixty-ninth aspect, alone or in combination with one or more of the sixty-first aspect through the sixty-eighth aspect, wherein the configuration includes a set of time instants over the LBT bandwidth of a NR-SS operation during which the one or more virtual full LBT procedures are to be performed; one or more channels on which the one or more virtual full LBT procedures are to be performed; and an energy detection threshold for the one or more virtual full LBT procedures, wherein the energy detection threshold is one of linked to a maximum transmit power of the UE or unlinked to the maximum transmit power.

In a seventieth aspect, alone or in combination with one or more of the sixty-first aspect through the sixty-ninth aspect, wherein the plurality of LBT statistics includes an LBT success ratio of the one or more virtual full LBT procedures over a predefined sliding measurement window.

In a seventy-first aspect, alone or in combination with one or more of the sixty-first aspect through the seventieth aspect, wherein the configuration includes one or more of an energy detection threshold for the one or more virtual full LBT procedures, wherein the energy detection threshold is one of linked to a maximum transmit power of the at least one served UE or unlinked to the maximum transmit power; one or more LBT parameters associated with a network device type other than a UE type of the at least one served UE; and a beamforming direction that identifies a direction to perform the one or more virtual full LBT procedures.

In a seventy-second aspect, alone or in combination with one or more of the sixty-first aspect through the seventy-first aspect, further including receiving, by the base station, a capabilities message from the at least one served UE, wherein the capabilities message includes a capability of the at least one served UE for use of virtual LBT procedures.

A seventy-third aspect configured for wireless communication may include means for configuring, by a base station, one or more virtual full LBT procedures for at least one served UE within an LBT bandwidth; means for signaling, by the base station, a configuration of the one or more virtual full LBT procedures to the at least one served UEs; means for receiving, by the base station, an LBT measurement report from the at least one served UEs, wherein the LBT measurement report includes a plurality of LBT statistics including a result of the one or more virtual full LBT procedures; and means for determining, by the base station, radio resource management of a connection with the at least one served UEs using the plurality of LBT statistics.

In a seventy-fourth aspect, alone or in combination with the seventy-third aspect, wherein the plurality of LBT statistics in the LBT measurement report further includes one or more LBT statistics associated with one or more transmission LBT procedures performed by the at least one served UE.

In a seventy-fifth aspect, alone or in combination with the seventy-third or seventy-fourth aspects, wherein LBT statistics include one or more of a time duration of each of the one or more virtual full LBT procedures and the one or more transmission LBT procedures; a number of DIFS periods experienced by the at least one served UE during the time duration; and a number of successfully checked-out virtual COTs, wherein the number of successfully checked-out virtual COTs reflects one of: a number of consecutive successfully checked-out virtual COTs or a total number of successfully checked-out COTs over a predefined interval.

In a seventy-sixth aspect, alone or in combination with one or more of the seventy-third aspect through the seventy-fifth aspect, wherein the one or more virtual full LBT procedures and the one or more transmission LBT procedures are associated with one of: a specific LBT priority class or a combination of LBT priority classes.

In a seventy-seventh aspect, alone or in combination with one or more of the seventy-third aspect through the seventy-sixth, wherein the means for configuring further includes means for configuring for the at least one served UE a virtual abbreviated LBT procedure on one or more candidate channels outside of a current channel within the LBT bandwidth.

In a seventy-eighth aspect, alone or in combination with one or more of the seventy-third aspect through the seventy-seventh aspect, further including means for signaling, by the base station, DCI including a virtual abbreviated LBT configuration, wherein the virtual abbreviated LBT configuration includes an instant and channel for the virtual abbreviated LBT procedure, wherein the channel is different from a transmit channel on which the DCI is signaled.

In a seventy-ninth aspect, alone or in combination with one or more of the seventy-third aspect through the seventy-eighth aspect, wherein the configuration includes a set of time instants over a FBE set of frames over the LBT bandwidth during which the one or more virtual full LBT procedures are to be performed; one or more channels on which the one or more virtual full LBT procedures are to be performed; and an energy detection threshold for the one or more virtual full LBT procedures, wherein the energy detection threshold is one of linked to a maximum transmit power of the at least one served UE or unlinked to the maximum transmit power.

In an eightieth aspect, alone or in combination with one or more of the seventy-third aspect through the seventy-ninth aspect, wherein the plurality of LBT statistics includes an LBT success ratio of the one or more virtual full LBT procedures over a predefined sliding measurement window.

In an eighty-first aspect, alone or in combination with one or more of the seventy-third aspect through the eightieth aspect, wherein the configuration includes a set of time instants over the LBT bandwidth of a NR-SS operation during which the one or more virtual full LBT procedures are to be performed; one or more channels on which the one or more virtual full LBT procedures are to be performed; and an energy detection threshold for the one or more virtual full LBT procedures, wherein the energy detection threshold is one of linked to a maximum transmit power of the UE or unlinked to the maximum transmit power.

In an eighty-second aspect, alone or in combination with one or more of the seventy-third aspect through the eighty-first aspect, wherein the plurality of LBT statistics includes an LBT success ratio of the one or more virtual full LBT procedures over a predefined sliding measurement window.

In an eighty-third aspect, alone or in combination with one or more of the seventy-third aspect through the eighty-second aspect, wherein the configuration includes one or more of an energy detection threshold for the one or more virtual full LBT procedures, wherein the energy detection threshold is one of linked to a maximum transmit power of the at least one served UE or unlinked to the maximum transmit power; one or more LBT parameters associated with a network device type other than a UE type of the at least one served UE; and a beamforming direction that identifies a direction to perform the one or more virtual full LBT procedures.

In an eighty-fourth aspect, alone or in combination with one or more of the seventy-third aspect through the eighty-third aspect, further including means for receiving, by the base station, a capabilities message from the at least one served UE, wherein the capabilities message includes a capability of the at least one served UE for use of virtual LBT procedures.

An eighty-fifth aspect may include a non-transitory computer-readable medium having program code recorded thereon, where the program code may include program code executable by a computer for causing the computer to configure, by a base station, one or more virtual full LBT procedures for at least one served UE within an LBT bandwidth; program code executable by the computer for causing the computer to signal, by the base station, a configuration of the one or more virtual full LBT procedures to the at least one served UEs; program code executable by the computer for causing the computer to receive, by the base station, an LBT measurement report from the at least one served UEs, wherein the LBT measurement report includes a plurality of LBT statistics including a result of the one or more virtual full LBT procedures; and program code executable by the computer for causing the computer to determine, by the base station, radio resource management of a connection with the at least one served UEs using the plurality of LBT statistics.

In an eighty-sixth aspect, alone or in combination with the eighty-fifth aspect, wherein the plurality of LBT statistics in the LBT measurement report further includes one or more LBT statistics associated with one or more transmission LBT procedures performed by the at least one served UE.

In an eighty-seventh aspect, alone or in combination with one or more of the eighty-fifth and eighty-sixty aspects, wherein LBT statistics include one or more of a time duration of each of the one or more virtual full LBT procedures and the one or more transmission LBT procedures; a number of DIFS periods experienced by the at least one served UE during the time duration; and a number of successfully checked-out virtual COTs, wherein the number of successfully checked-out virtual COTs reflects one of: a number of consecutive successfully checked-out virtual COTs or a total number of successfully checked-out COTs over a predefined interval.

In an eighty-eighth aspect, alone or in combination with one or more of the eighty-fifth aspect through the eighty-seventh aspect, wherein the one or more virtual full LBT procedures and the one or more transmission LBT procedures are associated with one of: a specific LBT priority class or a combination of LBT priority classes.

In an eighty-ninth aspect, alone or in combination with one or more of the eighty-fifth aspect through the eighty-eighth aspect, wherein the program code executable by the computer for causing the computer to configure further includes program code executable by the computer for causing the computer to configure for the at least one served UE a virtual abbreviated LBT procedure on one or more candidate channels outside of a current channel within the LBT bandwidth.

In a ninetieth aspect, alone or in combination with one or more of the eighty-fifth aspect through the eighty-ninth aspect, further including program code executable by the computer for causing the computer to signal, by the base station, DCI including a virtual abbreviated LBT configuration, wherein the virtual abbreviated LBT configuration includes an instant and channel for the virtual abbreviated LBT procedure, wherein the channel is different from a transmit channel on which the DCI is signaled.

In a ninety-first aspect, alone or in combination with one or more of the eighty-fifth aspect through the ninetieth aspect, wherein the configuration includes a set of time instants over a FBE set of frames over the LBT bandwidth during which the one or more virtual full LBT procedures are to be performed; one or more channels on which the one or more virtual full LBT procedures are to be performed; and an energy detection threshold for the one or more virtual full LBT procedures, wherein the energy detection threshold is one of linked to a maximum transmit power of the at least one served UE or unlinked to the maximum transmit power.

In a ninety-second aspect, alone or in combination with one or more of the eighty-fifth aspect through the ninety-first aspect, wherein the plurality of LBT statistics includes an LBT success ratio of the one or more virtual full LBT procedures over a predefined sliding measurement window.

In a ninety-third aspect, alone or in combination with one or more of the eighty-fifth aspect through the ninety-second aspect, wherein the configuration includes a set of time instants over the LBT bandwidth of a NR-SS operation during which the one or more virtual full LBT procedures are to be performed; one or more channels on which the one or more virtual full LBT procedures are to be performed; and an energy detection threshold for the one or more virtual full LBT procedures, wherein the energy detection threshold is one of linked to a maximum transmit power of the UE or unlinked to the maximum transmit power.

In a ninety-fourth aspect, alone or in combination with one or more of the eighty-fifth aspect through the ninety-third aspect, wherein the plurality of LBT statistics includes an LBT success ratio of the one or more virtual full LBT procedures over a predefined sliding measurement window.

In a ninety-fifth aspect, alone or in combination with one or more of the eighty-fifth aspect through the ninety-fourth aspect, wherein the configuration includes one or more of an energy detection threshold for the one or more virtual full LBT procedures, wherein the energy detection threshold is one of linked to a maximum transmit power of the at least one served UE or unlinked to the maximum transmit power; one or more LBT parameters associated with a network device type other than a UE type of the at least one served UE; and a beamforming direction that identifies a direction to perform the one or more virtual full LBT procedures.

In a ninety-sixth aspect, alone or in combination with one or more of the eighty-fifth aspect through the ninety-fifth aspect, further including program code executable by the computer for causing the computer to receive, by the base station, a capabilities message from the at least one served UE, wherein the capabilities message includes a capability of the at least one served UE for use of virtual LBT procedures.

A ninety-seventh aspect configured for wireless communication may include at least one processor; and a memory coupled to the at least one processor, wherein the at least one processor is configured to configure, by a base station, one or more virtual full LBT procedures for at least one served UE within an LBT bandwidth; to signal, by the base station, a configuration of the one or more virtual full LBT procedures to the at least one served UEs; to receive, by the base station, an LBT measurement report from the at least one served UEs, wherein the LBT measurement report includes a plurality of LBT statistics including a result of the one or more virtual full LBT procedures; and to determine, by the base station, radio resource management of a connection with the at least one served UEs using the plurality of LBT statistics.

In a ninety-eighth aspect, alone or in combination with the ninety-seventh aspect, wherein the plurality of LBT statistics in the LBT measurement report further includes one or more LBT statistics associated with one or more transmission LBT procedures performed by the at least one served UE.

In a ninety-ninth aspect, alone or in combination with one or more of the ninety-seventh or ninety-eighth aspects, wherein LBT statistics include one or more of a time duration of each of the one or more virtual full LBT procedures and the one or more transmission LBT procedures; a number of DIFS periods experienced by the at least one served UE during the time duration; and a number of successfully checked-out virtual COTs, wherein the number of successfully checked-out virtual COTs reflects one of: a number of consecutive successfully checked-out virtual COTs or a total number of successfully checked-out COTs over a predefined interval.

In a one-hundredth aspect, alone or in combination with one or more of the ninety-seventh aspect through the ninety-ninth aspect, wherein the one or more virtual full LBT procedures and the one or more transmission LBT procedures are associated with one of: a specific LBT priority class or a combination of LBT priority classes.

In a one-hundred-first aspect, alone or in combination with one or more of the ninety-seventh aspect through the one-hundredth aspect, wherein the configuration of the at least one processor to configure further includes configuration of the at least one processor to configure for the at least one served UE a virtual abbreviated LBT procedure on one or more candidate channels outside of a current channel within the LBT bandwidth.

In a one-hundred-second aspect, alone or in combination with one or more of the ninety-seventh aspect through the one-hundred-first aspect, further including configuration of the at least one processor to signal, by the base station, DCI including a virtual abbreviated LBT configuration, wherein the virtual abbreviated LBT configuration includes an instant and channel for the virtual abbreviated LBT procedure, wherein the channel is different from a transmit channel on which the DCI is signaled.

In a one-hundred-third aspect, alone or in combination with one or more of the ninety-seventh aspect through the one-hundred-second aspect, wherein the configuration includes a set of time instants over a FBE set of frames over the LBT bandwidth during which the one or more virtual full LBT procedures are to be performed; one or more channels on which the one or more virtual full LBT procedures are to be performed; and an energy detection threshold for the one or more virtual full LBT procedures, wherein the energy detection threshold is one of linked to a maximum transmit power of the at least one served UE or unlinked to the maximum transmit power.

In a one-hundred-fourth aspect, alone or in combination with one or more of the ninety-seventh aspect through the one-hundred-third aspect, wherein the plurality of LBT statistics includes an LBT success ratio of the one or more virtual full LBT procedures over a predefined sliding measurement window.

In a one-hundred-fifth aspect, alone or in combination with one or more of the ninety-seventh aspect through the one-hundred-fourth aspect, wherein the configuration includes a set of time instants over the LBT bandwidth of a NR-SS operation during which the one or more virtual full LBT procedures are to be performed; one or more channels on which the one or more virtual full LBT procedures are to be performed; and an energy detection threshold for the one or more virtual full LBT procedures, wherein the energy detection threshold is one of linked to a maximum transmit power of the UE or unlinked to the maximum transmit power.

In a one-hundred-sixth aspect, alone or in combination with one or more of the ninety-seventh aspect through the one-hundred-fifth aspect, wherein the plurality of LBT statistics includes an LBT success ratio of the one or more virtual full LBT procedures over a predefined sliding measurement window.

In a one-hundred-seventh aspect, alone or in combination with one or more of the ninety-seventh aspect through the one-hundred-sixth aspect, wherein the configuration includes one or more of an energy detection threshold for the one or more virtual full LBT procedures, wherein the energy detection threshold is one of linked to a maximum transmit power of the at least one served UE or unlinked to the maximum transmit power; one or more LBT parameters associated with a network device type other than a UE type of the at least one served UE; and a beamforming direction that identifies a direction to perform the one or more virtual full LBT procedures.

In a one-hundred-eighth aspect, alone or in combination with one or more of the ninety-seventh aspect through the one-hundred-seventh aspect, further including configuration of the at least one processor to receive, by the base station, a capabilities message from the at least one served UE, wherein the capabilities message includes a capability of the at least one served UE for use of virtual LBT procedures.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:
1. A method of wireless communication, comprising:
obtaining, by a user equipment (UE), a configuration to perform one or more virtual full listen before talk (LBT) procedures over a LBT bandwidth;
generating, by the UE, a LBT measurement report, wherein the LBT measurement report includes a plurality of LBT statistics and wherein the plurality of LBT statistics includes a result of the one or more virtual full LBT procedures, a time duration for each of the one or more virtual full LBT procedures, and a number of distributed inter-frame spacing (DIFS) periods present during the time duration; and
transmitting, by the UE, the LBT measurement report to a serving base station.

2. The method of claim 1, further including:
  performing, by the UE, the one or more virtual full LBT procedures over the LBT bandwidth; and
  performing, by the UE, one or more transmission LBT procedures over the LBT bandwidth, wherein the one or more transmission LBT procedures are performed in response to one or more of a scheduled transmission and a configured transmission, wherein:
  the plurality of LBT statistics of the LBT measurement report includes one or more LBT statistics associated with the one or more transmission LBT procedures, and
  performing, by the UE, the one or more virtual full LBT procedures comprises configuring the UE differently from a configuration to perform the one or more transmission LBT procedures.

3. The method of claim 2, wherein the plurality of LBT statistics further includes
  a number of successfully checked-out virtual channel occupancy times (COTs), wherein the number of successfully checked-out virtual COTs reflects a number of consecutive successfully checked-out virtual COTs or a total number of successfully checked-out COTs over a predefined interval.

4. The method of claim 2, wherein the transmitting is performed one of:
  upon completion by the UE of a minimum threshold number of one or both of the one or more virtual full LBT procedures and the one or more transmission LBT procedures;
  upon detecting by the UE a minimum abnormal threshold number of abnormal LBT results of one or both of the one or more virtual full LBT procedures and the one or more transmission LBT procedures over a predefined time window; or
  upon expiration of the predefined time window.

5. The method of claim 4, wherein the one or more virtual full LBT procedures and the one or more transmission LBT procedures are associated with one of: a specific LBT priority class or a combination of LBT priority classes.

6. The method of claim 4, wherein the abnormal LBT results include one or more of:
  a failure detected in one of the one or more virtual full LBT procedures and the one or more transmission LBT procedures;
  a successful LBT procedure of the one or more virtual full LBT procedures or the one or more transmission LBT procedures that exceeds a predefined LBT procedure duration; or
  the successful LBT procedure of the one or more virtual full LBT procedures or the one or more transmission LBT procedures in which the number of DIFS periods experienced by the UE exceeds a predefined threshold number of the DIFS.

7. The method of claim 2, wherein the configuration further causes the UE to perform a virtual abbreviated LBT procedure on one or more candidate channels outside of a current channel within the LBT bandwidth.

8. The method of claim 7, wherein the one or more candidate channels are contiguously adjacent to one of:
  the one or more virtual full LBT procedures; or
  the one or more transmission LBT procedures;
  over the LBT bandwidth.

9. The method of claim 1, further including:
  receiving, by the UE, downlink control information (DCI) including a virtual abbreviated LBT configuration; and
  performing, by the UE, one or more abbreviated virtual LBT procedures at an instant and channel indicated by the virtual abbreviated LBT configuration, wherein the channel indicated by the virtual abbreviated LBT configuration is different from a receive channel on which the DCI is received.

10. The method of claim 1, wherein the configuration includes:
  a set of time instants over a frame-based equipment (FBE) set of frames over the LBT bandwidth during which the one or more virtual full LBT procedures are to be performed;
  one or more channels on which the one or more virtual full LBT procedures are to be performed; and
  an energy detection threshold for the one or more virtual full LBT procedures, wherein the energy detection threshold is one of linked to a maximum transmit power of the UE or unlinked to the maximum transmit power.

11. The method of claim 10, wherein the plurality of LBT statistics further includes a LBT success ratio of the one or more virtual full LBT procedures over a predefined sliding measurement window.

12. The method of claim 1, wherein the configuration includes:
  a set of time instants over the LBT bandwidth of a new radio-spectrum sharing (NR-SS) operation during which the one or more virtual full LBT procedures are to be performed;
  one or more channels on which the one or more virtual full LBT procedures are to be performed; and
  an energy detection threshold for the one or more virtual full LBT procedures, wherein the energy detection threshold is one of linked to a maximum transmit power of the UE or unlinked to the maximum transmit power.

13. The method of claim 1, wherein the configuration includes one or more of:
  an energy detection threshold for the one or more virtual full LBT procedures, wherein the energy detection threshold is one of linked to a maximum transmit power of the UE or unlinked to the maximum transmit power;
  one or more LBT parameters associated with a network device type other than a UE type of the UE; and
  a beamforming direction that identifies a direction to perform the one or more virtual full LBT procedures.

14. The method of claim 1, further including:
  transmitting, by the UE, a capabilities message to the serving base station, wherein the capabilities message includes a capability of the UE for use of virtual LBT procedures.

15. The method of claim 1, wherein the configuration to perform the one or more virtual LBT procedures causes the one or more virtual LBT procedures to be bidirectional, wherein a first virtual LBT procedure has a first direction, and wherein a second virtual LBT procedure has a second direction distinct from the first direction.

16. The method of claim 1, wherein the transmitting is performed in response to detecting, by the UE, a minimum abnormal threshold number of abnormal LBT results of one or both of the one or more virtual full LBT procedures and one or more transmission LBT procedures over a predefined time window, and wherein the abnormal LBT results include a successful LBT procedure of the one or more virtual full LBT procedures or the one or more transmission LBT procedures in which the number of DIFS periods experienced by the UE exceeds a predefined threshold number of the DIFS.

17. An apparatus configured for wireless communication, the apparatus comprising:
- at least one processor; and
- a memory coupled to the at least one processor,
- wherein the at least one processor is configured to:
  - obtain, by a user equipment (UE), a configuration to perform one or more virtual full listen before talk (LBT) procedures over a LBT bandwidth;
  - generate, by the UE, a LBT measurement report, wherein the LBT measurement report includes a plurality of LBT statistics including and wherein the plurality of LBT statistics includes a result of the one or more virtual full LBT procedures, a time duration for each of the one or more virtual full LBT procedures, and a number of distributed inter-frame spacing (DIFS) periods present during the time duration; and
  - transmit, by the UE, the LBT measurement report to a serving base station.

18. The apparatus of claim 17, further including configuration of the at least one processor to:
- perform, by the UE, one or more transmission LBT procedures over the LBT bandwidth, wherein the one or more transmission LBT procedures are performed in response to one or more of a scheduled transmission and a configured transmission, wherein the plurality of LBT statistics of the LBT measurement report include one or more LBT statistics associated with the one or more transmission LBT procedures.

19. The apparatus of claim 18, wherein the plurality of LBT statistics further includes
- a number of successfully checked-out virtual channel occupancy times (COTs), wherein the number of successfully checked-out virtual COTs reflects one of: a number of consecutive successfully checked-out virtual COTs or a total number of successfully checked-out COTs over a predefined interval.

20. The apparatus of claim 19, wherein the configuration of the at least one processor to transmit is performed one of:
- upon completion by the UE of a minimum threshold number of one or both of the one or more virtual full LBT procedures and the one or more transmission LBT procedures;
- upon detecting by the UE a minimum abnormal threshold number of abnormal LBT results of one or both of the one or more virtual full LBT procedures and the one or more transmission LBT procedures over a predefined time window; or
- upon expiration of the predefined time window.

21. The apparatus of claim 20, wherein the one or more virtual full LBT procedures and the one or more transmission LBT procedures are associated with one of: a specific LBT priority class or a combination of LBT priority classes.

22. The apparatus of claim 20, wherein the abnormal LBT results include one or more of:
- a failure detected in one of the one or more virtual full LBT procedures and the one or more transmission LBT procedures;
- a successful LBT procedure of the one or more virtual full LBT procedures or the one or more transmission LBT procedures that exceeds a predefined LBT procedure duration; or
- the successful LBT procedure of the one or more virtual full LBT procedures or the one or more transmission LBT procedures in which the number of DIFS periods experienced by the UE exceeds a predefined threshold number of the DIFS.

23. The apparatus of claim 18, wherein the configuration further causes the UE to perform a virtual abbreviated LBT procedure on one or more candidate channels outside of a current channel within the LBT bandwidth.

24. The apparatus of claim 23, wherein the one or more candidate channels are contiguously adjacent to one of:
- the one or more virtual full LBT procedures; or
- the one or more transmission LBT procedures;
over the LBT bandwidth.

25. The apparatus of claim 18, further including configuration of the at least one processor to:
- receive, by the UE, downlink control information (DCI) including a virtual abbreviated LBT configuration; and
- perform, by the UE, one or more abbreviated virtual LBT procedures at an instant and channel indicated by the virtual abbreviated LBT configuration, wherein the channel indicated by the virtual abbreviated LBT configuration is different from a receive channel on which the DCI is received.

26. The apparatus of claim 17, wherein the configuration includes:
- a set of time instants over a frame-based equipment (FBE) set of frames over the LBT bandwidth during which the one or more virtual full LBT procedures are to be performed;
- one or more channels on which the one or more virtual full LBT procedures are to be performed; and
- an energy detection threshold for the one or more virtual full LBT procedures, wherein the energy detection threshold is one of linked to a maximum transmit power of the UE or unlinked to the maximum transmit power.

27. The apparatus of claim 26, wherein the plurality of LBT statistics further includes a LBT success ratio of the one or more virtual full LBT procedures over a predefined sliding measurement window.

28. The apparatus of claim 17, wherein the configuration includes:
- a set of time instants over the LBT bandwidth of a new radio-spectrum sharing (NR-SS) operation during which the one or more virtual full LBT procedures are to be performed;
- one or more channels on which the one or more virtual full LBT procedures are to be performed; and
- an energy detection threshold for the one or more virtual full LBT procedures, wherein the energy detection threshold is one of linked to a maximum transmit power of the UE or unlinked to the maximum transmit power.

29. The apparatus of claim 17, wherein the configuration includes one or more of:
- an energy detection threshold for the one or more virtual full LBT procedures, wherein the energy detection threshold is one of linked to a maximum transmit power of the UE or unlinked to the maximum transmit power;
- one or more LBT parameters associated with a network device type other than a UE type of the UE; and
- a beamforming direction that identifies a direction to perform the one or more virtual full LBT procedures.

30. The apparatus of claim 17, further including configuration of the at least one processor to:
- transmit, by the UE, a capabilities message to the serving base station, wherein the capabilities message includes a capability of the UE for use of virtual LBT procedures.

* * * * *